(12) United States Patent
Kim

(10) Patent No.: US 12,061,496 B2
(45) Date of Patent: Aug. 13, 2024

(54) FOLDABLE DISPLAY DEVICE AND METHOD OF OPERATING THE SAME

(71) Applicant: SAMSUNG DISPLAY CO., LTD., Yongin-si (KR)

(72) Inventor: Minsoo Kim, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 225 days.

(21) Appl. No.: 17/658,350

(22) Filed: Apr. 7, 2022

(65) Prior Publication Data

US 2023/0004187 A1 Jan. 5, 2023

(30) Foreign Application Priority Data

Jul. 2, 2021 (KR) ........................ 10-2021-0087408

(51) Int. Cl.
*G06F 1/16* (2006.01)
*G06F 3/04886* (2022.01)

(52) U.S. Cl.
CPC .......... *G06F 1/1616* (2013.01); *G06F 1/1643* (2013.01); *G06F 3/04886* (2013.01)

(58) Field of Classification Search
CPC .... G06F 1/1616; G06F 1/1618; G06F 1/1643; G06F 1/1652; G06F 3/04886; G06F 2203/04102
See application file for complete search history.

(56) References Cited

U.S. PATENT DOCUMENTS

| 9,542,097 B2 | 1/2017 | Ganey et al. |
| 2010/0182265 A1* | 7/2010 | Kim ................ G06F 1/1641 345/1.3 |
| 2011/0047459 A1 | 2/2011 | Van Der Westhuizen |
| 2014/0184503 A1 | 7/2014 | Jang et al. |
| 2021/0096742 A1* | 4/2021 | Yoon ................ G06F 3/04883 |
| 2022/0391085 A1* | 12/2022 | Noh ................ G06F 3/04815 |
| 2022/0413694 A1* | 12/2022 | Youn ................ G06F 1/1616 |

FOREIGN PATENT DOCUMENTS

| KR | 10-2014-0088487 | 7/2014 |
| KR | 10-2110975 | 6/2020 |

* cited by examiner

*Primary Examiner* — Jared Fureman
*Assistant Examiner* — Christopher J Clark
(74) *Attorney, Agent, or Firm* — F. CHAU & ASSOCIATES, LLC

(57) ABSTRACT

A foldable display device includes a screen maintained in one of a folded state and an unfolded state, the screen, when switched from the unfolded state to the folded state, being divided into a first screen sensing a user input and a second screen displaying a first image, and a controller displaying a specific image corresponding to the user input on the second screen when the user input is sensed on the first screen in the folded state. The first screen displays a second image that is the same as the first image.

19 Claims, 22 Drawing Sheets

FOLDABLE DISPLAY DEVICE AND METHOD OF OPERATING THE SAME

CROSS-REFERENCE TO RELATED APPLICATION

This U.S. non-provisional patent application claims priority under 35 U.S.C. § 119 of Korean Patent Application No. 10-2021-0087408, filed on Jul. 2, 2021, the contents of which are hereby incorporated by reference in its entirety.

BACKGROUND

1. Field of Disclosure

The present disclosure relates to a foldable display device and a method of operating the same. More particularly, the present disclosure relates to a foldable display device with improved operational convenience for a user and a method of operating the foldable display device.

2. Description of the Related Art

With the development of information and communication technology and the diversified needs of information society, terminals, such as personal computers, smart phones, mobile terminals, and portable electronic devices, are being rapidly developed and widely used. Users input data into terminals using various types of input devices, such as a keyboard, a mouse, a trackball, a stylus pen, a touch screen, and a button. A graphic user interface (GUI) refers to an environment that allows users to interact with electronic devices through graphical icons displayed on a display screen. As electronic devices develop, various types of display devices that demand a user operation are adopting the GUI, and the user's input and output are performed through the GUI.

SUMMARY

The present disclosure provides a foldable display device with improved operational convenience for a user.

The present disclosure provides a method of operating the foldable display device.

The present disclosure provides a foldable display device capable of reducing an unnecessary operation of the user and improving an input accuracy by providing an image, which is obtained by reducing an image displayed on a display screen, to a touch pad and generating a cursor on the image displayed on the display screen to correspond to a user's touch point on the touch pad.

The present disclosure provides a method of operating the foldable display device.

According to an embodiment of the present invention, a foldable display device includes a screen having one of a folded state and an unfolded state, the screen, when switched from the unfolded state to the folded state, being divided into a first screen sensing a user input and a second screen displaying a first image, and a controller displaying a specific image corresponding to the user input on the second screen when the user input is sensed on the first screen in the folded state. The first screen displays a second image that is the same as the first image.

According to an embodiment of the present invention, a method of operating a foldable display device including a screen maintained in one of a folded state and an unfolded state and including a first screen sensing a user input and a second screen displaying a first image in the folded state, includes sensing a first user input applied to a first coordinate of the first screen in the folded state of the screen, generating a cursor image at a second coordinate corresponding to the first coordinate on the second screen, and performing a clicking operation on the second coordinate when the first user input is released. The first screen displays a second image that is the same as the first image displayed on the second screen.

According to the above, an unnecessary operation of the user is reduced and an input accuracy is improved by providing an image, which is obtained by reducing an image displayed on a display screen, to a touch pad and generating the cursor on the image displayed on the display screen to correspond to a user's touch point on the touch pad.

BRIEF DESCRIPTION OF THE DRAWINGS

The above and other advantages of the present disclosure will become readily apparent with reference to the following detailed description when considered in conjunction with the accompanying drawings wherein.

DETAILED DESCRIPTION

Figure 1A:
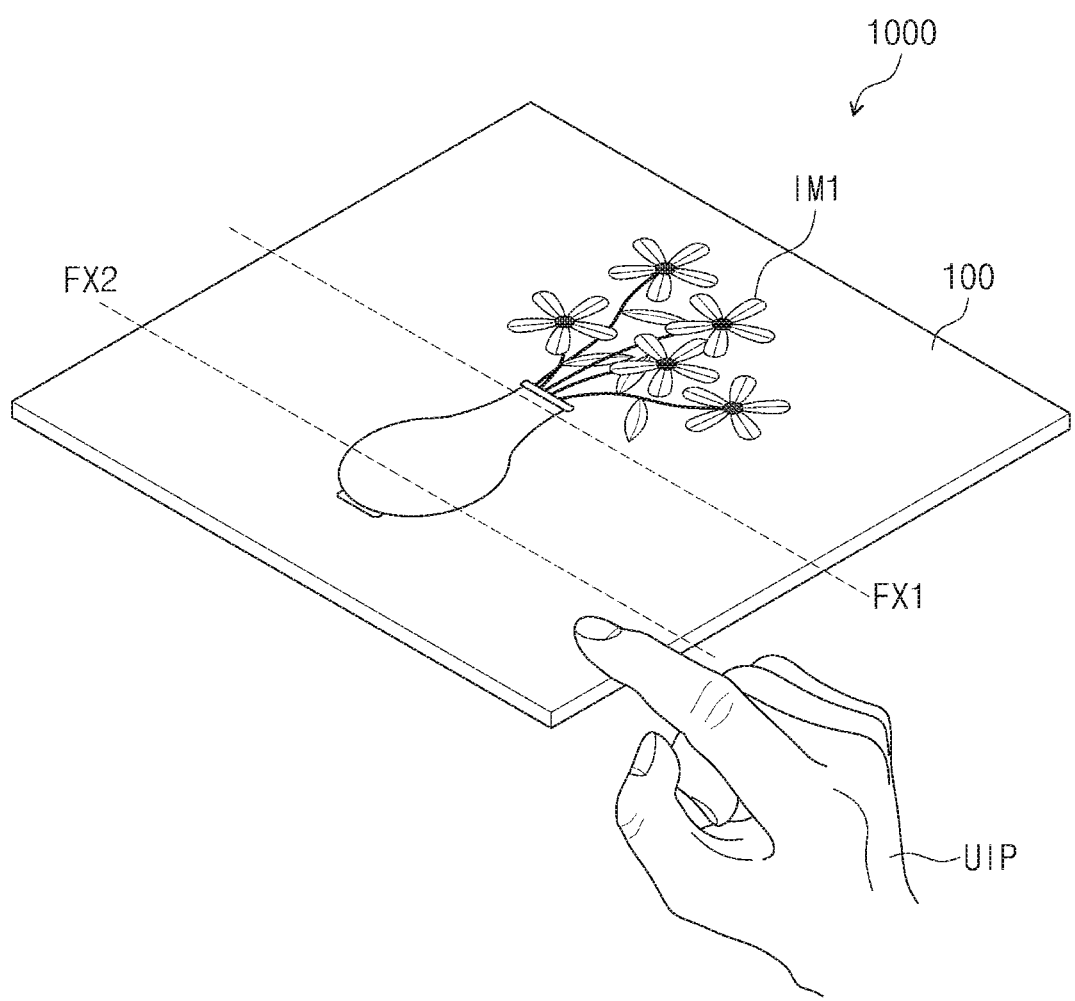
FIGS. 1A and 1B are perspective views showing display devices according to an embodiment of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to accompanying drawings.

Figure 1B:
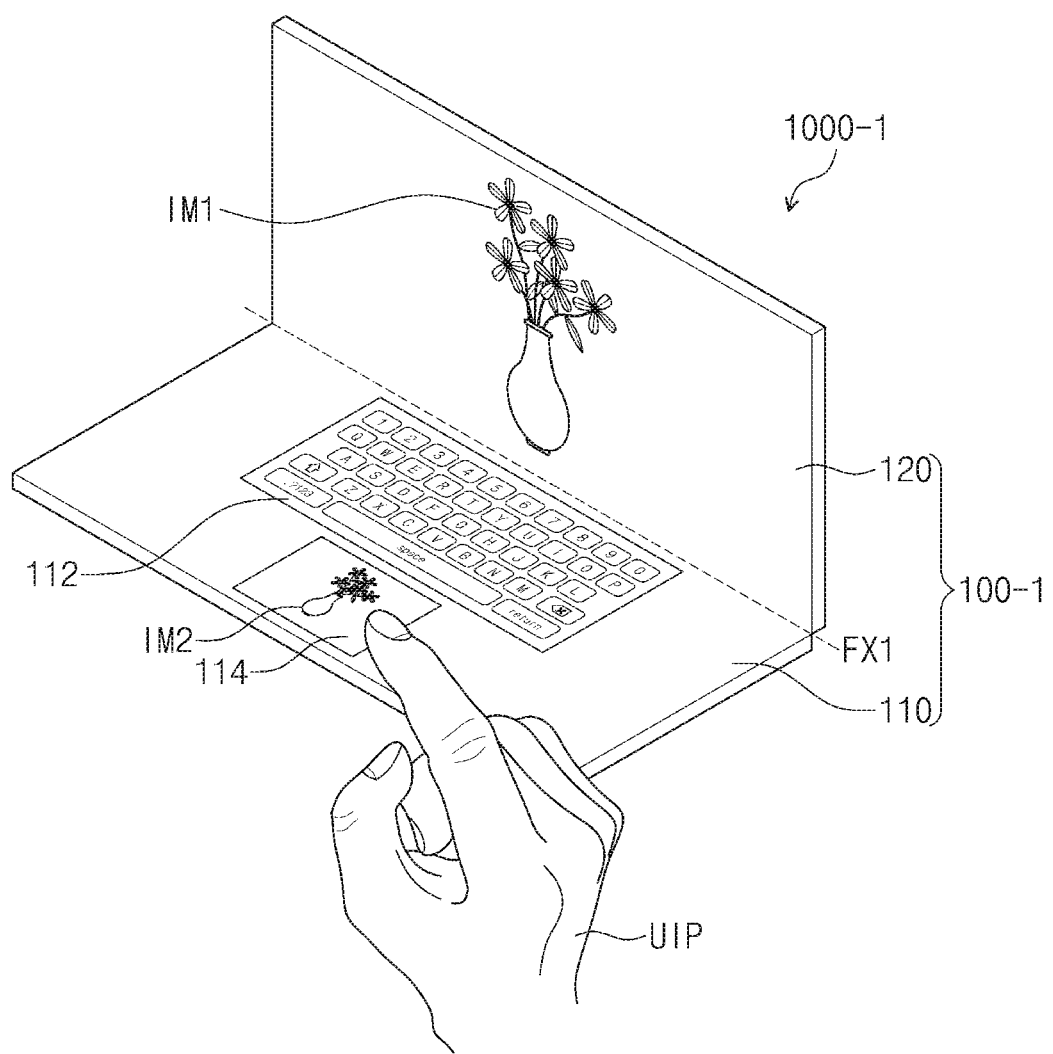

FIGS. 1A and 1B are perspective views showing display devices 1000 and 1000-1 according to an embodiment of the present disclosure.

FIG. 1A shows the display device 1000 in an unfolded state. FIG. 1B shows the display device 1000-1 in a folded state. Hereinafter, the display devices 1000 and 1000-1 indicate a foldable display device. The term "folded state" refers to the display device 1000 being partially folded unless otherwise stated.

As shown in FIG. 1A, the display device 1000 may include a screen 100 through which a first image IM1 is entirely displayed. The screen 100 may entirely display the first image IM1, and a user input UIP may be sensed through the screen 100. In the unfolded state of FIG. 1A, the screen 100 may display the first image IM1 and sense the user input UIP.

As shown in FIG. 1B, the display device 1000-1 may be folded with respect to a first folding axis FX1. FIG. 1B shows the display device 1000-1 folded at an angle of about 90 degrees. The present invention, however, is not limited thereto or thereby. According to an embodiment, the display device 1000-1 may be freely folded at an angle between about 0 degrees and about 180 degrees. According to an embodiment, the display device 1000-1 may be folded up to an angle of about 360 degrees.

According to the present embodiment, the folded display device 1000-1 may include a screen 100-1 that is divided into a first screen 110 and a second screen 120 in the folded state. The first screen 110 and the second screen 120 may be divided based on the first folding axis FX1. In some embodiments, the display device 1000-1 may be folded with respect to a second folding axis FX2. The first folding axis FX1 may extend along a center of the display device 1000, and the second folding axis FX2 may be freely defined as needed at positions other than a position at which the first folding axis FX1 is defined. As an example, the second folding axis FX2 may be defined at a position corresponding to a quarter of the display device 1000. According to an embodiment, the second folding axis FX2 may be defined at a position corresponding to a third of the display device 1000.

The first screen 110 may be used to sense the user input UIP. The first screen 110 may display a touch screen to sense the user input UIP. As an example, a keyboard, a touch pad, and the like may be displayed as the touch screen. According to the present embodiment, the display device 1000-1 may receive the user input UIP via the first screen 110 and may output the user input UIP to the second screen 120. The user input UIP may be a user touch. The user input UIP may be an input caused by an input device, e.g., an active pen, instead of the user touch.

The keyboard and the touch pad may be substantially simultaneously displayed on the first screen 110. In some embodiments, when the display device 1000 of FIG. 1 is changed to a folded state, the display configuration of the display device 1000 of FIG. 1 may be changed to the display configuration of FIG. 1B in which the keyboard and the touch pad may be displayed on the first screen 110, and the first image IM1 of the display device 1000 of FIG. 1 may be displayed on the second screen 120. FIG. 1B shows the keyboard and the touch pad that are arranged along a direction perpendicular to the folding axes FX1. The present invention, however, is not limited thereto or thereby. According to an embodiment, the keyboard and the touch pad may be arranged in a direction different from the above-mentioned direction. According to an embodiment, the keyboard or the touch pad may be selectively displayed on the first screen 110.

According to an embodiment, the first screen 110 may include a first area 112 and a second area 114. The first area 112 may correspond to an area in which the keyboard is displayed. In some embodiments, the keyboard may be a virtual keyboard displayed on the first screen 110 as a still image. The second area 114 may be an area in which the touch pad is displayed. The touch pad may correspond to a virtual touch pad displayed on the first screen 110 as a still image or a video.

The second screen 120 may correspond to a screen on which an image is displayed. The second screen 120 may have a resolution higher than the first screen 110. In some embodiments, the image may correspond to a still image or a video. A cursor may be displayed on the image in the second screen 120.

According to an embodiment, a second image IM2, which is the same as the first image IM1 displayed on the second screen 120, may be displayed in the second area 114 of the first screen 110. The image displayed in the touch pad of the display device 1000-1 may be the same as the image displayed in the second screen 120 of the display device 1000-1. In some embodiments, when the display device 1000 of FIG. 1 is changed to a folded state, the first image IM1 of the display device 1000 of FIG. 1 may be displayed on the second screen 120 and the second area 114 of the first screen 110. The first image IM1 displayed on the second area 114 of the first screen 110 may be referred to as the second image IM2.

The second image IM2 may correspond to an image having the same image as the first image IM1 but having a reduced size to fit into a size of the second area 114. For the convenience of descriptions, a flowerpot with flowers is shown as the first image IM1 and the second image IM2, however, this is merely one example.

A controller (not shown) may be connected to the screens 100 and 100-1 to display the cursor on the screen in response to the user input UIP. In more detail, the controller may receive the user input UIP through the first screen 110 and may output a specific image such as the cursor through the second screen 120.

Figure 2A:
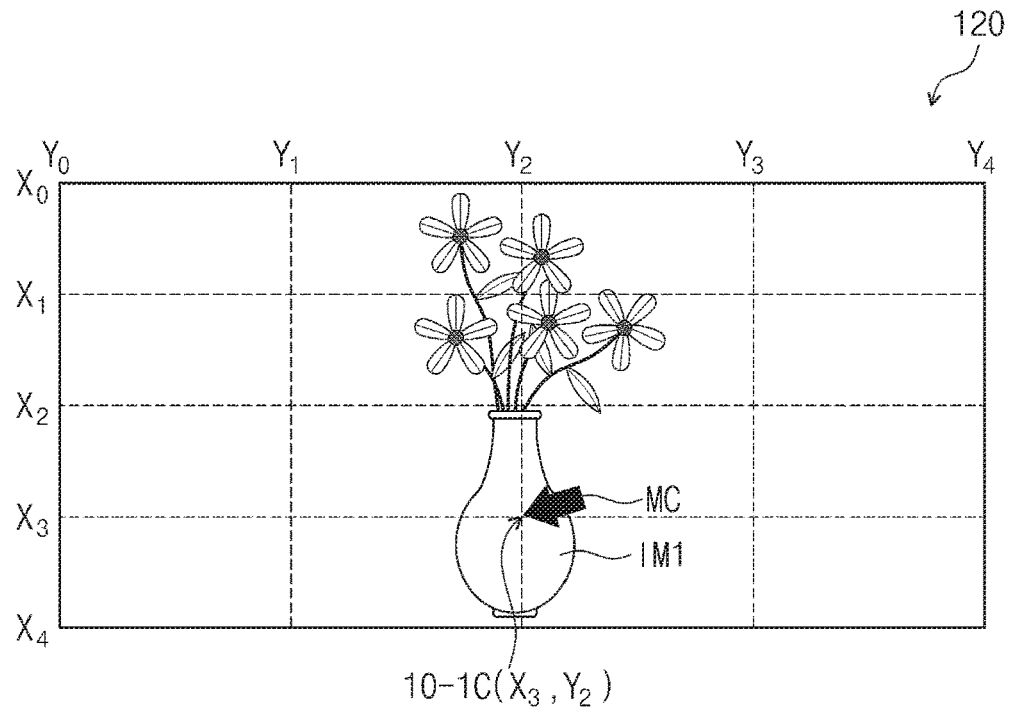
FIGS. 2A and 2B are views showing screens according to an embodiment of the present disclosure.
Figure 2B:
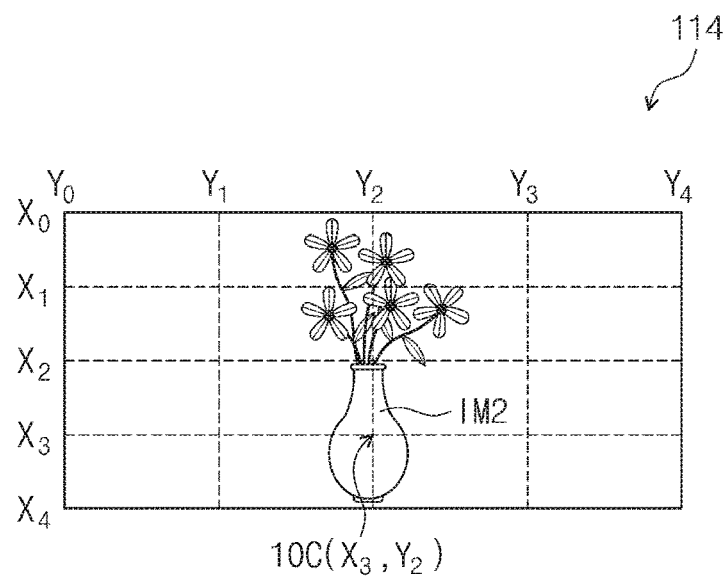
Figure 3A:
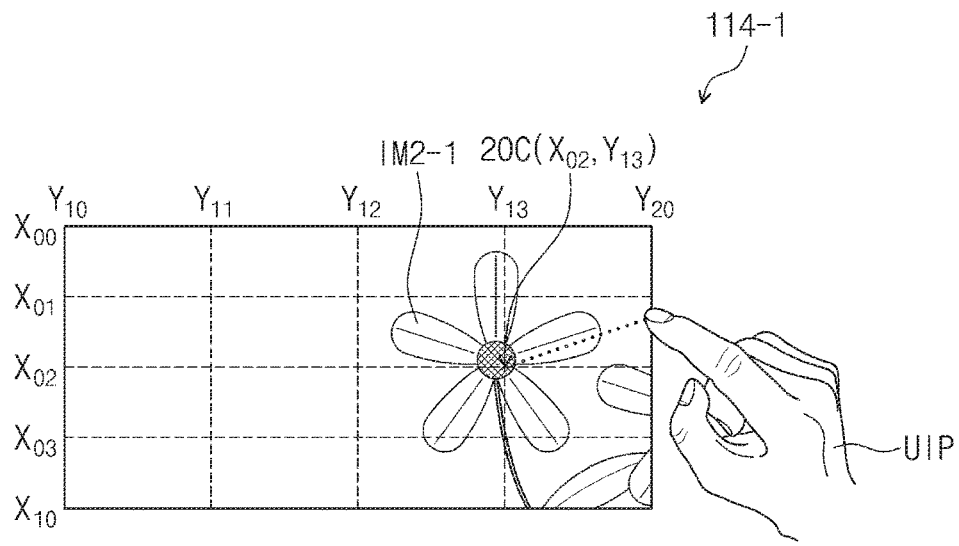
FIGS. 3A and 3B are views showing screens according to an embodiment of the present disclosure.
Figure 3B:
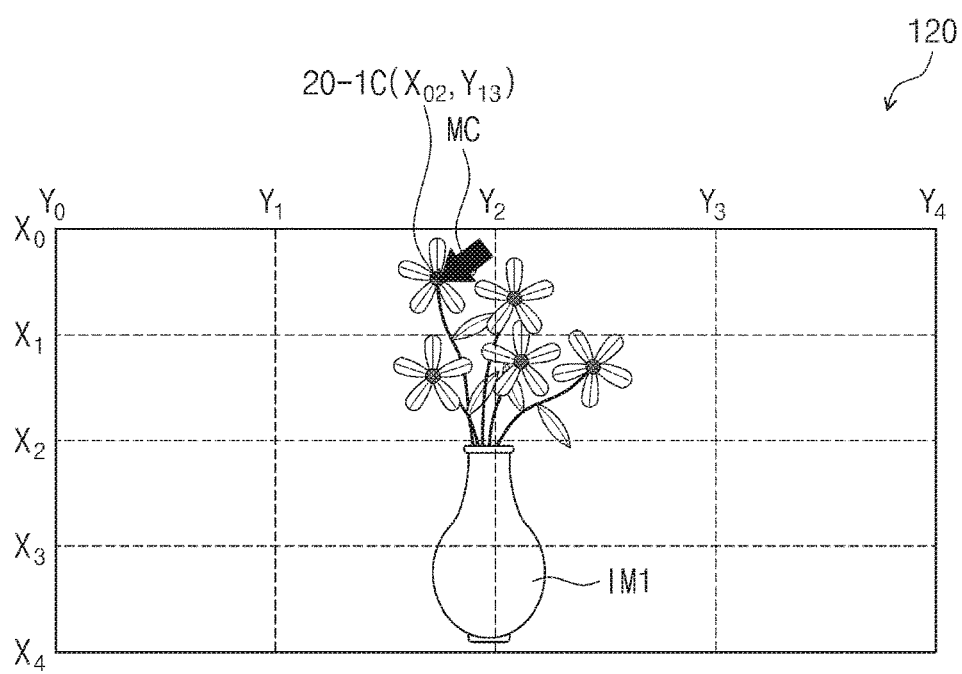

FIGS. 2A and 2B are views showing the screens according to an embodiment of the present disclosure. FIGS. 3A and 3B are views showing screens according to an embodiment of the present disclosure.

FIG. 2A shows the second screen 120. FIG. 2B shows the second area 114 of the first screen 110 corresponding to the second screen of FIG. 2A. The second area 114 of the first screen 110 shown in FIG. 2B is electrically connected to the second screen 120 of FIG. 2A.

In FIGS. 2A and 2B, the second image IM2 that is the same as the first image IM1 of the second screen 120 may be displayed in the second area 114 of the first screen 110.

Referring to FIGS. 2A and 2B, the same coordinate area (i.e., the same coordinate system) may be set on the first image IM1 and the second image IM2. Using the same coordinate area, a coordinate of a specific portion on the first image IM1 may be the same as a coordinate of the same portion on the second image IM2.

As an example, coordinates of a first portion 10C on the second image IM2 are (X3, Y2). The second image IM2 may be obtained by reducing the first image IM1. The coordinate area of the second image IM2 may be the same as that of the first image IM1. Accordingly, coordinates of a second portion (i.e., a second coordinate) 10-1C on the first image IM1 of the second screen 120 are (X3, Y2).

According to an embodiment, when the user input UIP is sensed on the first portion 10C of the second image IM2 of the second area 114 in the first screen 110, a cursor MC may be displayed on the second portion 10-1C having the same coordinates in the second screen 120. For example, the controller may receive the user input UIP on the first portion 10C of the first screen 110 and may generate the cursor MC on the second portion 10-1C of the second screen 120.

However, since the first screen 110 is smaller than the second screen 120, it is not easy for the user to accurately touch a desired portion in the first screen 110. Accordingly, the second image IM2 displayed on the first screen 110 may be enlarged. The user may enlarge the second image IM2 in the second area 114 and then may touch a desired portion.

According to an embodiment, the coordinate area may be set on the second image IM2, and thus, the coordinate area may be enlarged or reduced according to the enlargement and reduction of the image. This will be described in detail with reference to FIG. 3A.

FIG. 3A shows a second area 114-1 including a second image IM2-1 which is an enlarged image of a specific portion of FIG. 2B. FIG. 3B shows a second screen 120 corresponding to FIG. 3A.

FIG. 3A shows an enlarged area of a specific petal in FIG. 2A. Only the enlarged petal is shown in the second area 114-1 of FIG. 3A. FIG. 3B shows the second screen 120 connected to a first screen 110 of FIG. 3A. In FIG. 3B, the first image IM1 of the second screen 120 is not enlarged. For example, the second image IM2-1 of the first screen 110 may be enlarged and reduced independently from the first image IM1 of the second screen 120.

The second image IM2-1 may be enlarged or reduced due to an enlargement or reduction input provided through the first screen 110 by the user. In some embodiments, the enlargement or reduction input may be defined by a specific input operation of the user. As an example, the user may reduce the second image IM2-1 by pinching-in the second image IM2-1 with two fingers. In addition, the user may enlarge the second image IM2-1 by pinching-out the second image IM2-1 with two fingers.

When the second image IM2-1 is enlarged, a coordinate area on the second image IM2-1 may be enlarged. According to an embodiment, coordinates of the area AA' in which the enlarged petal is disposed, which is surrounded by coordinates (XO, Y1), (XO, Y2), (Xl, Y1), and (Xl, Y2), may be subdivided according to the enlargement. The accuracy of the user input UIP may be improved according to the subdivision of the coordinates.

When the user input UIP is sensed on specific coordinates 20C (hereinafter, referred to as a first coordinate) of the enlarged second image IM2-1 of FIG. 3A, the cursor MC may be generated at the same coordinates 20-1C (hereinafter, referred to as a second coordinate) as the specific coordinates on the second screen 120 of FIG. 3B.

As an example, when the user input UIP is sensed at the first coordinate 20C on the enlarged second image IM2-1, the cursor MC may be displayed at the second coordinate 20-1C that is the same as the first coordinate 20C in the second screen 120. In some embodiments, the first coordinate 20C and the second coordinate 20-1C may have the same coordinate values (X02, Y13). In some embodiments, the first image IM1 of the second screen 120 may not be enlarged or reduced. According to the present disclosure, when the user wants to precisely click a specific location within the image on the screen, the user may perform a precise click simply by enlarging or reducing the touch pad providing the same image without the need to enlarge or reduce the image on the screen. According to the embodiment of the present disclosure, the user may precisely click a specific petal.

Figure 4A:
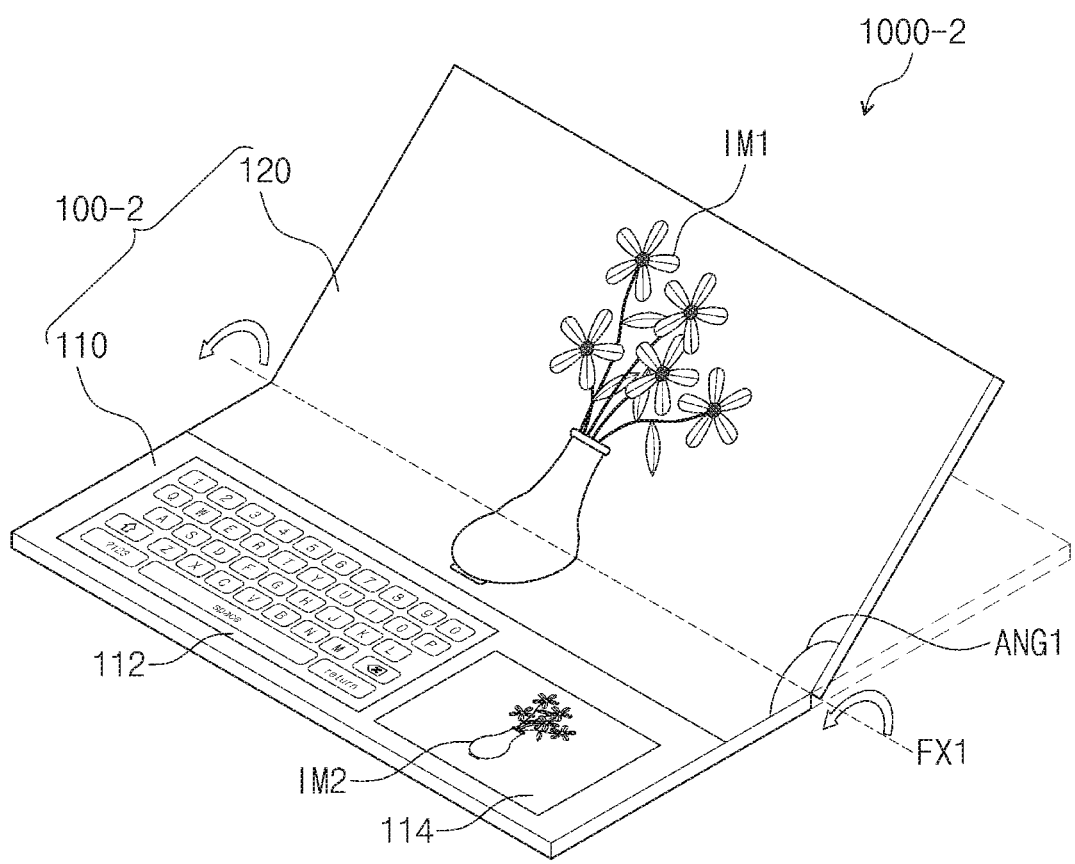
FIGS. 4A and 4B are perspective views showing display devices according to embodiments of the present disclosure.
Figure 4B:
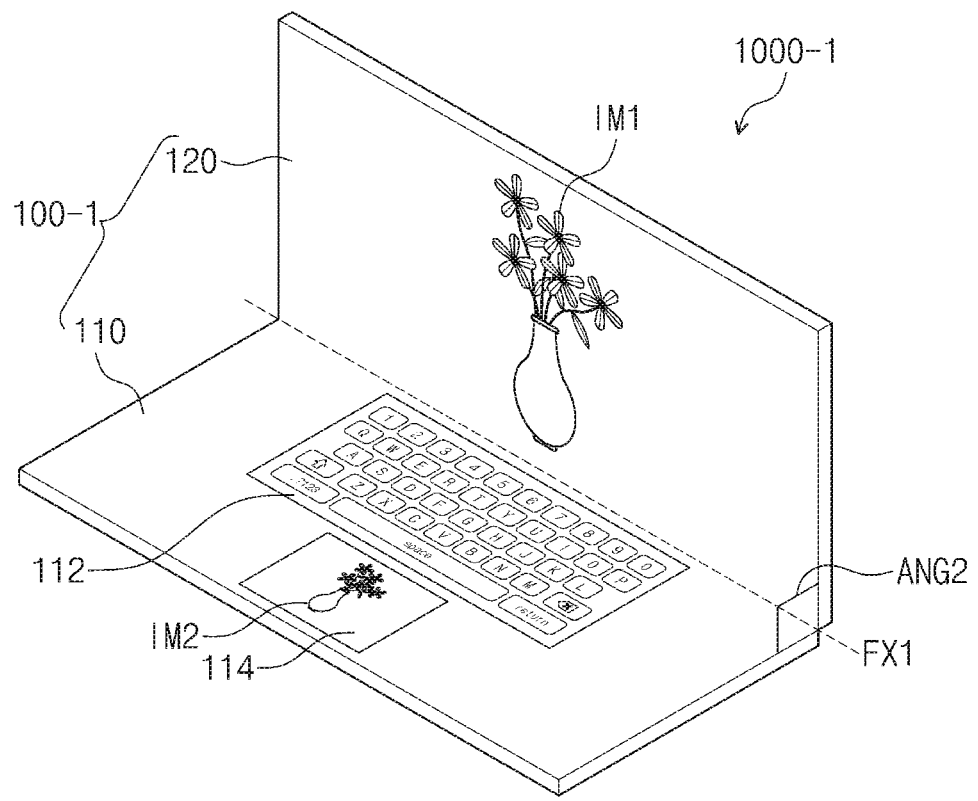

FIGS. 4A and 4B are perspective views showing display devices 1000-2 and 1000-1 according to embodiments of the present disclosure.

FIGS. 4A and 4B show a folded state of each of the display devices 1000-2 and 1000-1 folded with respect to a first folding axis FX1. FIG. 4A shows the display device 1000-2 folded at a first angle ANG1 between about 90 degrees and about 180 degrees, and FIG. 4B shows the display device 1000-1 folded at a second angle ANG2 of about 90 degrees. Terms such as "about" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

In FIGS. 4A and 4B, a size of a second screen 120 may be changed depending on a folding degree (i.e., a folding angle) of the display devices 1000-2 and 1000-1 folded with respect to the first folding axis FX1. According to an embodiment, the size of the second screen 120 may be greater when the display device 1000-2 is folded at the first angle ANG1 than when the display device 1000-1 is folded at the second angle ANG2 or less. The size of the second screen 120 may be automatically changed as the folded state is changed with respect to the folding degree of the display device. In some embodiments, the folding degree with respect to the first folding axis FX1 may be an angle between a plane of the first screen 110 and a plane of the second screen 120.

In FIG. 4A, the second screen 120 may include the first folding axis FX1. A size of a first screen 110 may be greater when the display device 1000-2 is folded at the first angle ANG1 than when the display device 1000-1 is folded at the second angle ANG2.

An arrangement structure of a first area 112 and a second area 114 when the display device 1000-2 is folded at the first angle ANG1 may be different from an arrangement structure of a first area 112 and a second area 114 when the display device 1000-1 is folded at the second angle ANG2.

According to an embodiment, in the case of the display device 1000-1 folded at the second angle ANG2, the first area 112 and the second area 114 may be sequentially arranged in a direction perpendicular to the first folding axis FX1, and thus, one of the first and second areas 112 and 114 is disposed closer to the folding axis FX1 and the other of the first and second areas 112 and 114 is disposed farther away from the first folding axis FX1. Since the size of the first screen 110 when the display device 1000-2 is folded at the first angle ANG1 is smaller than the size of the first screen 110 when the display device 1000-2 is folded at the second angle ANG2, the first area 112 and the second area 114 may be arranged in parallel to each other along a direction in which the first folding axis FX1 extends as shown in FIG. 4A.

For example, the arrangement of the first area 112 and the second area 114 of the first screen 110 may be changed depending on the folding degree of the display devices 1000-1 and 1000-2 in the folded state. The arrangement of the first area 112 and the second area 114 may be automatically changed as the folded degree is changed.

The second screen 120 may have a first size at the first angle ANG1 and may have a second size different from the first size at the second angle ANG2. The first size may be greater than the second size. According to an embodiment, as the display device starts being folded from the unfolded state, the size of the second screen 120 may gradually decrease, and the size of the first screen 110 may gradually increase. As an example, as the first angle ANG1 decreases, the size of the second screen 120 may gradually decrease, and the size of the first screen 110 may gradually increase. When the first angle ANG1 reaches the second angle ANG2, the screen 100-1 may be divided into the first screen 110 and the second screen 120 with respect to the first folding axis FX1. The arrangement of the first area 112 and the second area 114 may be automatically changed to the arrangement of the first area 112 and the second area 114 as shown in FIG. 4B from the arrangement of the first area 112 and the second area 114 as shown in FIG. 4A when the folding angle of the display device reaches the second angle ANG2. For example, when the folding angle of the display device may be a predetermined angle, the first screen 110 and the second screen 120 may be divided with respect to the first folding axis FX1, and the first screen 110 may have the first area 112 and the second area 114 as shown in FIG. 4B. The predetermined angle may be about 90 degrees. The present invention is not limited thereto. In some embodiments, the predetermined angle may be greater than about 90 degrees or smaller than 90 degrees.

Figure 5A:
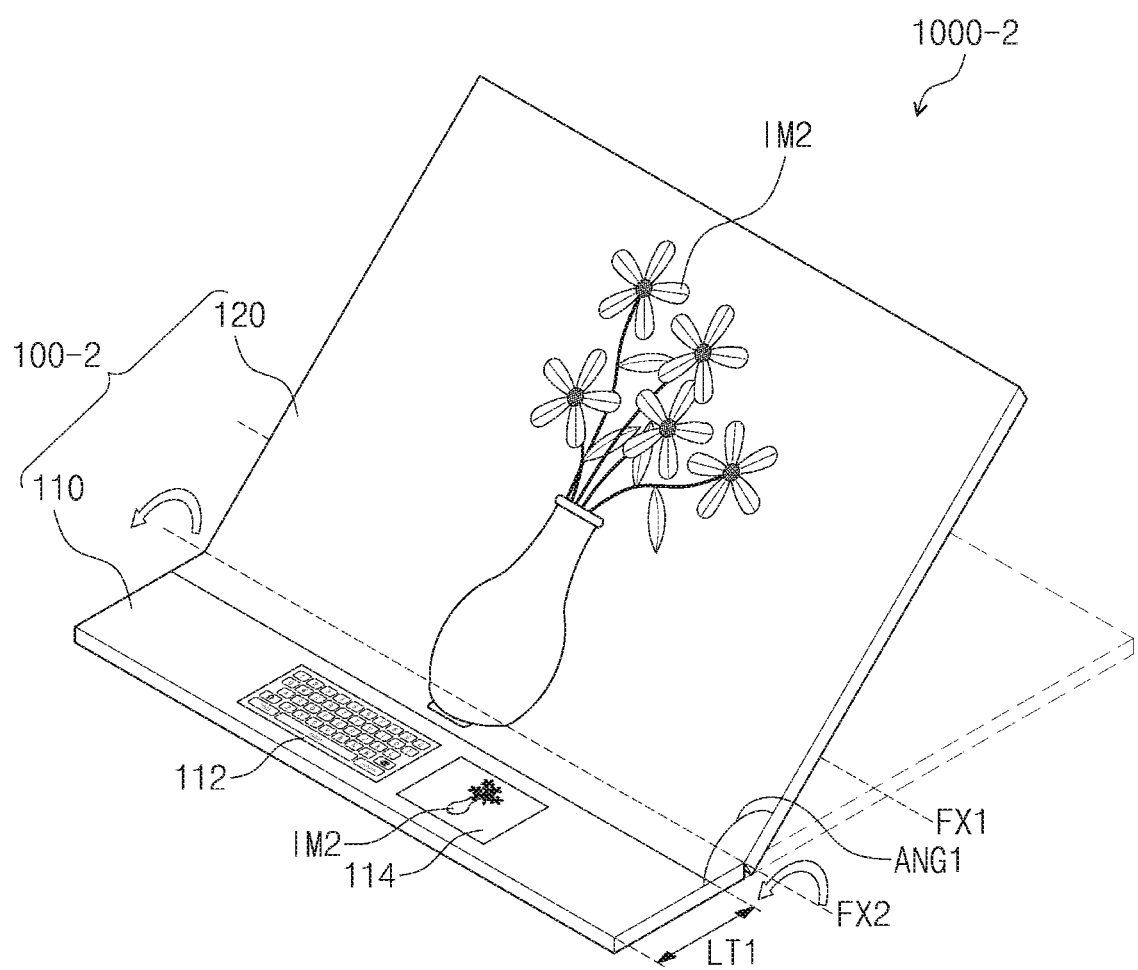
FIGS. 5A and 5B are perspective views showing display devices according to embodiments of the present disclosure.
Figure 5B:
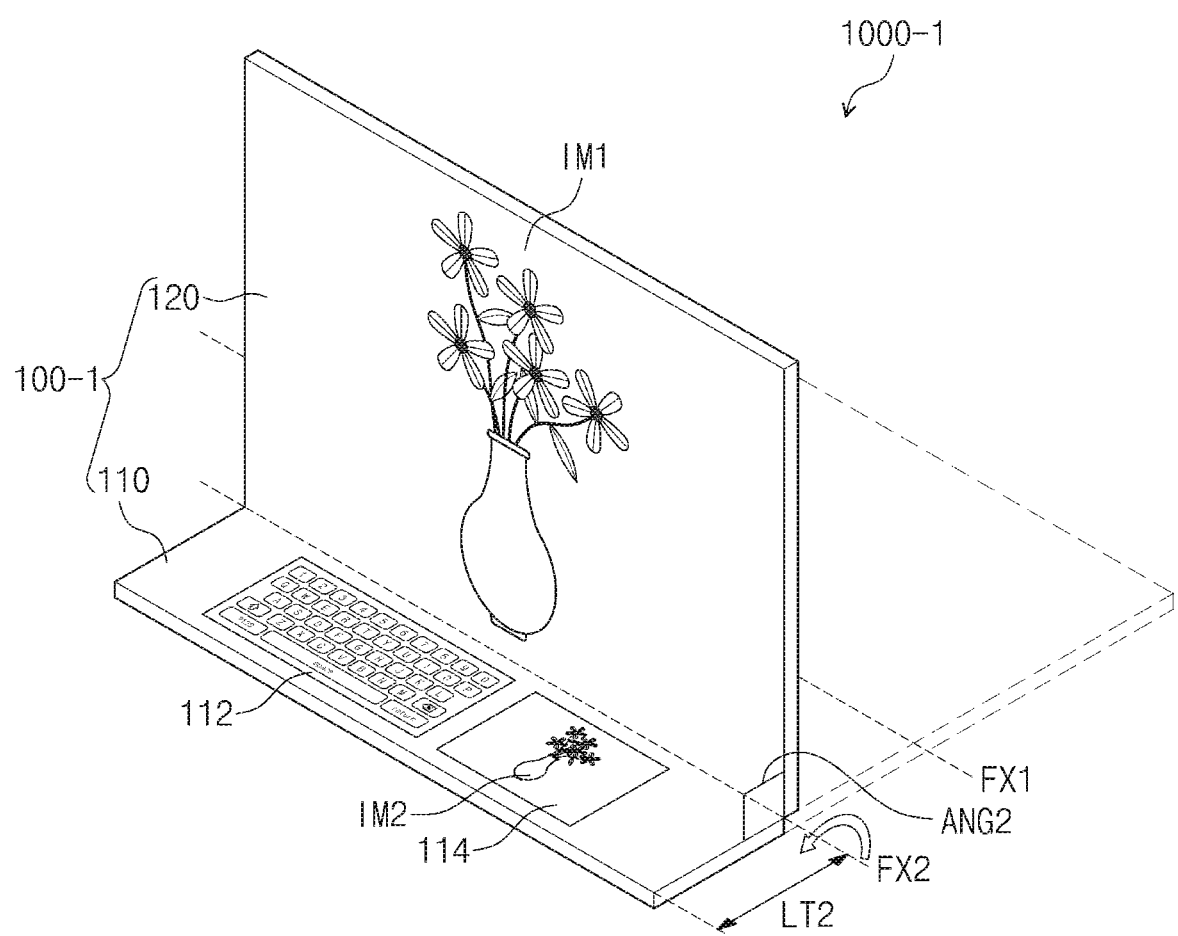

FIGS. 5A and 5B are perspective views showing display device 1000-2 and 1000-1 according to embodiments of the present disclosure.

FIGS. 5A and 5B show a folded state of each of the display devices 1000-2 and 1000-1 folded with respect to a second folding axis FX2. FIG. 5A shows the display device 1000-2 folded at a first angle ANG1 between about 90 degrees and about 180 degrees, and FIG. 5B shows the display device 1000-1 folded at a second angle ANG2 of about 90 degrees.

As described with reference to FIGS. 4A and 4B, a size of a second screen 120 may be changed depending on a folding degree of the display device 1000-2 and 1000-1 folded with respect to the second folding axis FX2 in FIGS. 5A and 5B. A size of a first screen 110 may be changed as the size of the second screen 120 is changed.

The size of the first screen 110 may be greater when the display device 1000-1 is folded at the second angle ANG2 than that when the display device 1000-2 is folded at the first angle ANG1. As an example, when the display device 1000-2 is folded at the first angle ANG1, the first screen 110 may have a first length LT1 in a direction substantially perpendicular to the second folding axis FX2. When the display device 1000-1 is folded at the second angle ANG2, the first screen 110 may have a second length LT2 in the direction substantially perpendicular to the second folding axis FX2. In some embodiments, the first length LT1 may be smaller than the second length LT2.

According to an embodiment, the size of the first area 112 and the size of the second area 114 may be changed depending on the folding angle. As an example, since the first length LT1 defined based on the folding angle is smaller than the second length LT2, the size of the first area 112 and the size of the second area 114 of the first screen 110 of the display device 1000-2 folded at the first angle ANG1 may be smaller than the size of the first area 112 and the size of the second area 114 of the display device 1000-1 folded at the second angle ANG2. Although not shown in figures, the arrangement of the first area 112 and the second area 114 may be changed depending on the folding angle.

According to an embodiment, the size of the first screen 110 may be automatically changed as the folded state is changed. As an example, the size of the first screen 110 may gradually increase as the folding angle is changed from the first angle ANG1 to the second angle ANG2. The lengths LT1 and LT2 of the first screen 110 in the direction substantially perpendicular to the second folding axis FX2 may gradually increase as the folding angle decreases. When the display device 1000-2 is folded at the first angle ANG1, the second folding axis FX2 may be defined in the second screen 120. When the display device 1000-1 is folded at the second angle ANG2, the second folding axis FX2 may be defined at a boundary between the first screen 110 and the second screen 120. For example, when the folding angle of the display device may be a predetermined angle, the first screen 110 and the second screen 120 may be divided with respect to the second folding axis FX2, and the first screen 110 may have the first area 112 and the second area 114 as shown in FIG. 5B. The predetermined angle may be about 90 degrees. The present invention is not limited thereto. In some embodiments, the predetermined angle may be greater than about 90 degrees or smaller than 90 degrees.

Figure 6A:
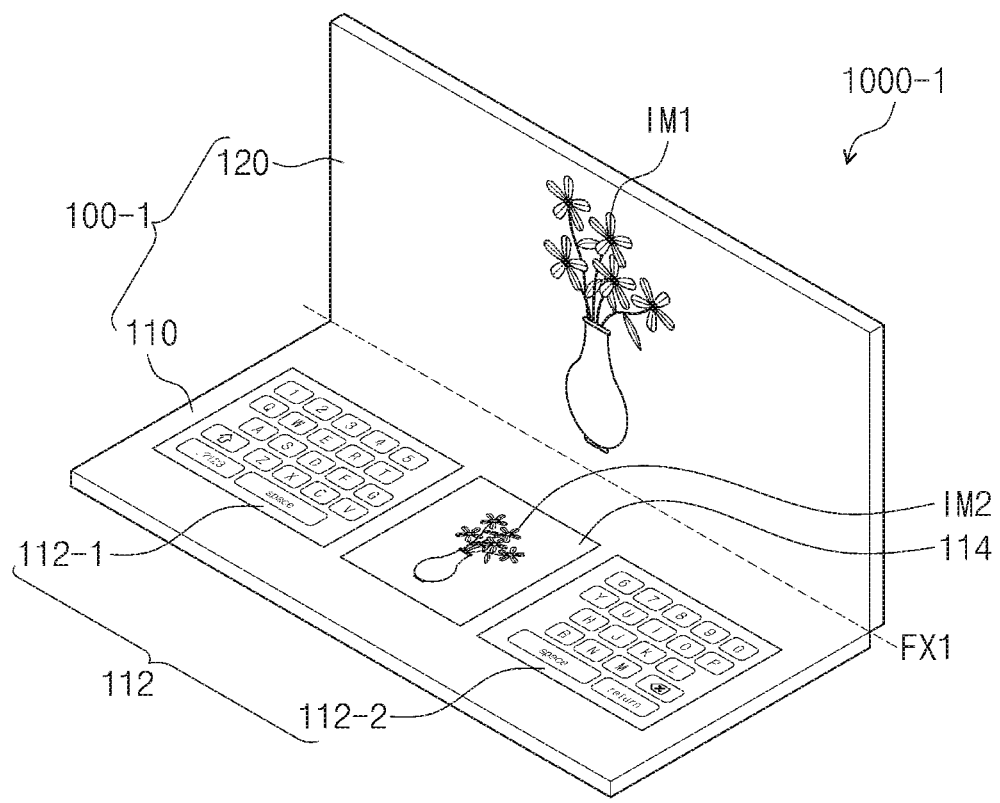
FIGS. 6A and 6B are perspective views showing a display device according to an embodiment of the present disclosure.
Figure 6B:
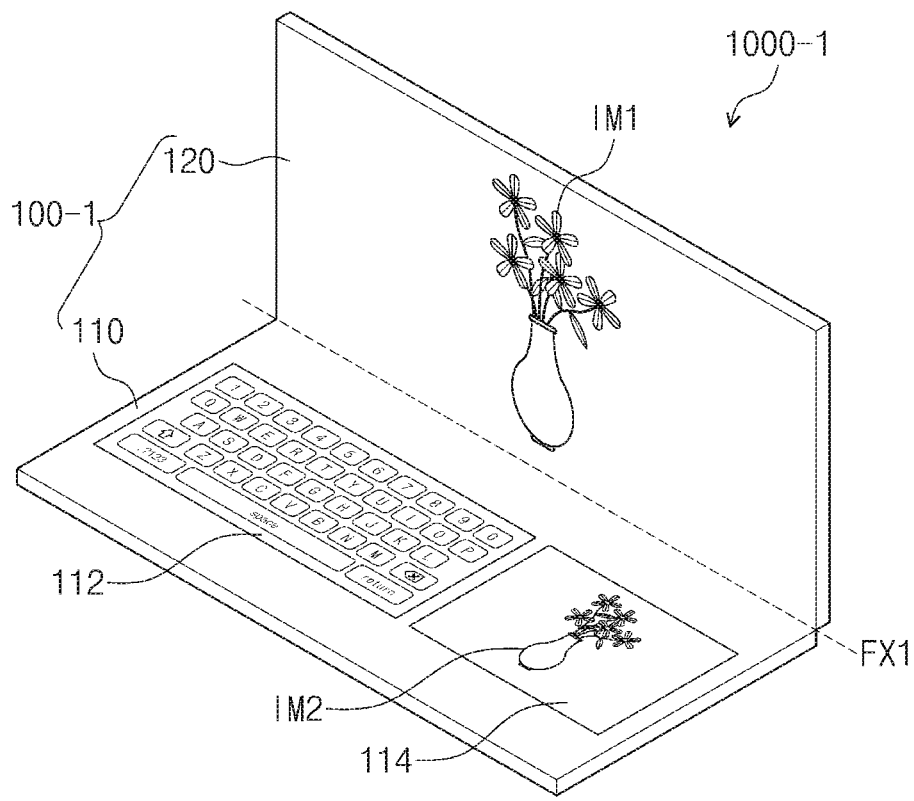

FIGS. 6A and 6B are perspective views showing display devices 1000-1 according to embodiments of the present disclosure.

As shown in FIGS. 6A and 6B, an arrangement of a first area 112 and a second area 114 in a first screen 110 of FIG. 6A may be different from an arrangement of a first area 112 and a second area 114 in a first screen 110 of FIG. 6B. FIGS. 6A and 6B show an arrangement structure of the first area 112 and the second area 114. The arrangement structure of the first area 112 and the second area 114 may be changed depending on the user input UIP. As an example, the user may change the arrangement and a size of a virtual keyboard in the first area 112 and a touch pad in the second area 114 as desired.

In FIG. 6A, the first area 112 may be divided into a first portion 112-1 and a second portion 112-2 with the second area 114 disposed between the first portion 112-1 and the second portion 112-2. Each of the first portion 112-1 and the second portion 112-2 may include a portion of the virtual keyboard. The second area 114 may include the touch pad.

In FIG. 6B, the virtual keyboard of the first area 112 and the touch pad of the second area 114 may be arranged along a direction in which the first folding axis FX1 extends. The display device 1000-1 shown in FIG. 6B is merely one example, and the direction in which the first area 112 and the second area 114 are arranged may be different from that of FIG. 6B. In FIGS. 6A and 6B, the display devices 1000-1 is folded with respect to the first folding axis FX1, however, this is merely one example. The present embodiment may be applied to the display device 1000-2 folded with respect to the second folding axis FX2 (refer to FIG. 5A).

Figure 7:
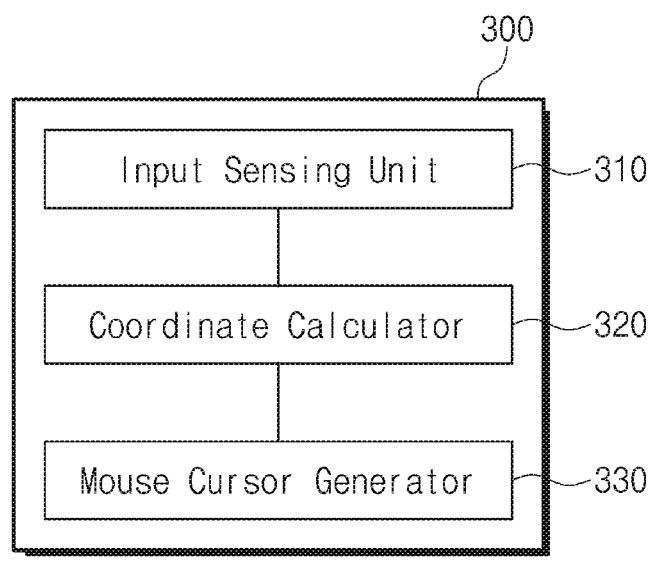
FIG. 7 is a block diagram showing a controller according to an embodiment of the present disclosure.

FIG. 7 is a block diagram showing a controller 300 according to an embodiment of the present disclosure.

Referring to FIG. 7, the controller 300 may include an input sensing unit 310, a coordinate calculator 320, and a cursor generator 330. The controller 300 may be electrically connected to the first screen 110 and the second screen 120 to control the first screen 110 and the second screen 120. The controller 300 may receive the user input UIP (refer to FIG. 1A) from the first screen 110 and may generate the specific image on the second screen 120.

The input sensing unit 310 may sense the user input UIP (refer to FIG. 3A) from the first screen 110. The input sensing unit 310 may sense the user input UIP applied to the second image IM2 of the second area 114 including the touch pad of the first screen 110 and may transmit the sensed user input UIP to the coordinate calculator 320.

According to an embodiment, the input sensing unit 310 may sense a selection input, an enlargement input, a reduction input, and a drag input, which are generated by the user. The input sensing unit 310 may distinguish the selection input from among various types of the user inputs UIP and may transmit the selection input to the coordinate calculator 320 when the selection input is sensed. In some embodiments, the selection input may correspond to an input to specify and click the specific coordinates. As an example, the selection input may correspond to a case where a specific portion of the second image IM2 is pressed for about 0.5 seconds or more. When the selection input is sensed on the first screen 110, the cursor may be generated at the same coordinates on the second screen 120 as the coordinates of the sensed selection input.

The enlargement input or the reduction input may correspond to the user input to enlarge or to reduce the second image IM2 on the second area 114 of the first screen 110. As an example, the enlargement input or the reduction input may correspond to an operation of double tapping a specific portion in the second image IM2.

The drag input may correspond to an input that moves the cursor. The drag input may be entered followed by the selection input. The cursor MC of the second screen 120 may move to another coordinates by the drag input from the coordinates at which the cursor MC is generated.

According to an embodiment, the input sensing unit may sense a click input. The click input may be generated when the image displayed at a position where the cursor is generated is clicked. The click input may be generated after the selection input. As an example, the click input may correspond to an operation of releasing the touch after the selection input that touches the specific portion. For example, the user may generate the cursor by pressing a finger (or an active pen) on the specific portion of the second image IM2 and may click the specific portion by releasing the finger (or the active pen).

The coordinate calculator 320 may calculate the first coordinate 10 (refer to FIG. 2B) with respect to the user input UIP on the first screen 110. The coordinate calculator 320 may calculate the second coordinate 10-1C corresponding to the first coordinate 10 on the second screen 120.

The cursor generator 330 may generate the cursor MC on the calculated second coordinate 10-1C of the second screen 120. The cursor generator 330 may move the generated cursor MC in response to the drag input from the user.

FIGS. 8 to 11 are flowcharts showing a method of operating a display device according to an embodiment of the present disclosure. Hereinafter, the operating method of the display device will be described with reference to FIGS. 2A and 2B, FIGS. 3A and 3B, FIGS. 4A and 4B, FIGS. 5A and 5B, and FIGS. 6A and 6B in addition to FIGS. 8 to 11.

Figure 8:
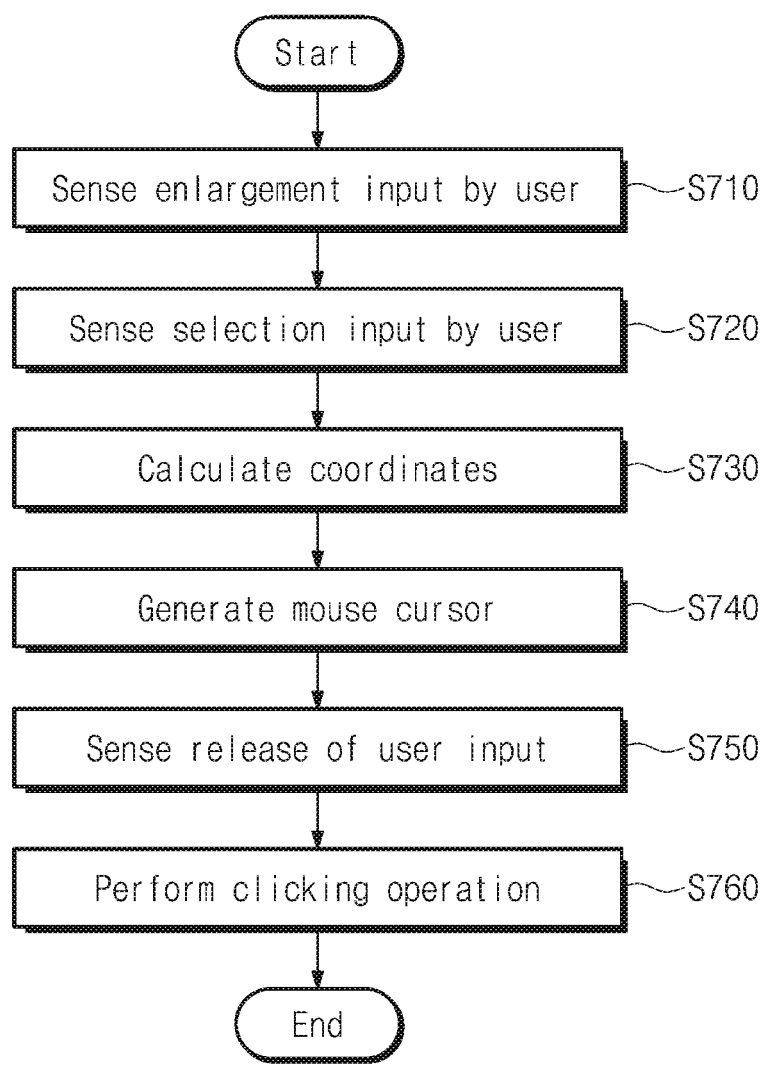
FIGS. 8 to 11 are flowcharts showing a method of operating a display device according to an embodiment of the present disclosure.

FIG. 8 schematically shows the operating method of the display device. As described with reference to FIG. 7, the input sensing unit 310 may sense the enlargement input and/or the selection input by the user (S710 and S720). According to an embodiment, when the enlargement input is sensed by the input sensing unit 310, the second image IM2-1 of the first screen 110 may be enlarged.

When the selection input from the user is sensed on the second image IM2-1, the coordinate calculator 320 may calculate the coordinates of the portion where the selection input is sensed (S730).

The cursor generator 330 may generate the cursor on the coordinates calculated by the coordinate calculator 320 (S740). The cursor MC may be displayed on the second screen 120.

When it is sensed that the selection input is released by the input sensing unit 310 (S750), the cursor generator 330 may perform the operation of clicking the portion where the cursor MC is displayed (S760). The cursor MC may disappear after the clicking operation is performed.

Figure 9:
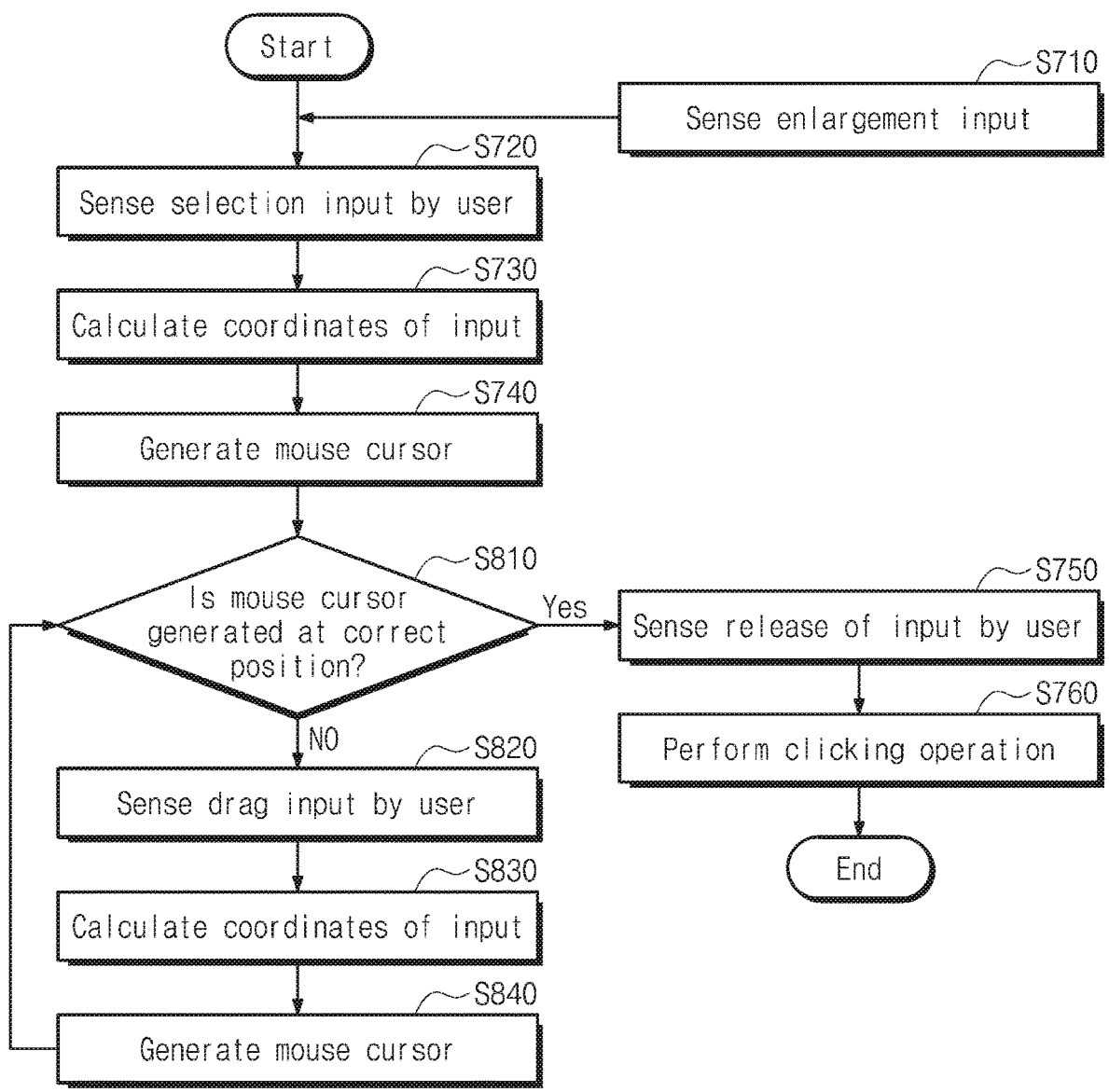

FIG. 9 is a flowchart showing the operating method of the display device shown in FIG. 8 in detail. FIG. 9 shows a general operation process.

Referring to FIG. 9, when the cursor MC is generated at specific coordinates by a first selection input from the user, the user may determine whether a position where the cursor is generated is as intended. For example, it may be determined whether the position where the cursor is generated by the user is correct (S810).

When it is determined that the cursor is generated at the correct position according to the user's determination, the user may release the touch input (S750). For example, the controller 300 may sense the release of the selection input of the user and may perform the clicking operation.

When it is determined that the cursor is generated at an incorrect position according to the user's determination, the user will try to move the cursor to the correct position through the drag input (S820). For example, the controller 300 may sense the drag input by the user and may move the cursor on the second screen 120. For example, the controller 300 may calculate the second coordinate of a position to which the cursor moves from the first coordinate in response to a second selection input and may generate again the cursor at the position corresponding to the calculated coordinates (S830 and S840). Then, when it is determined that the position where the cursor is generated is correct by the user (S810), the user may release the input, and thus, the clicking operation may be performed (S750 and S760).

Figure 10:
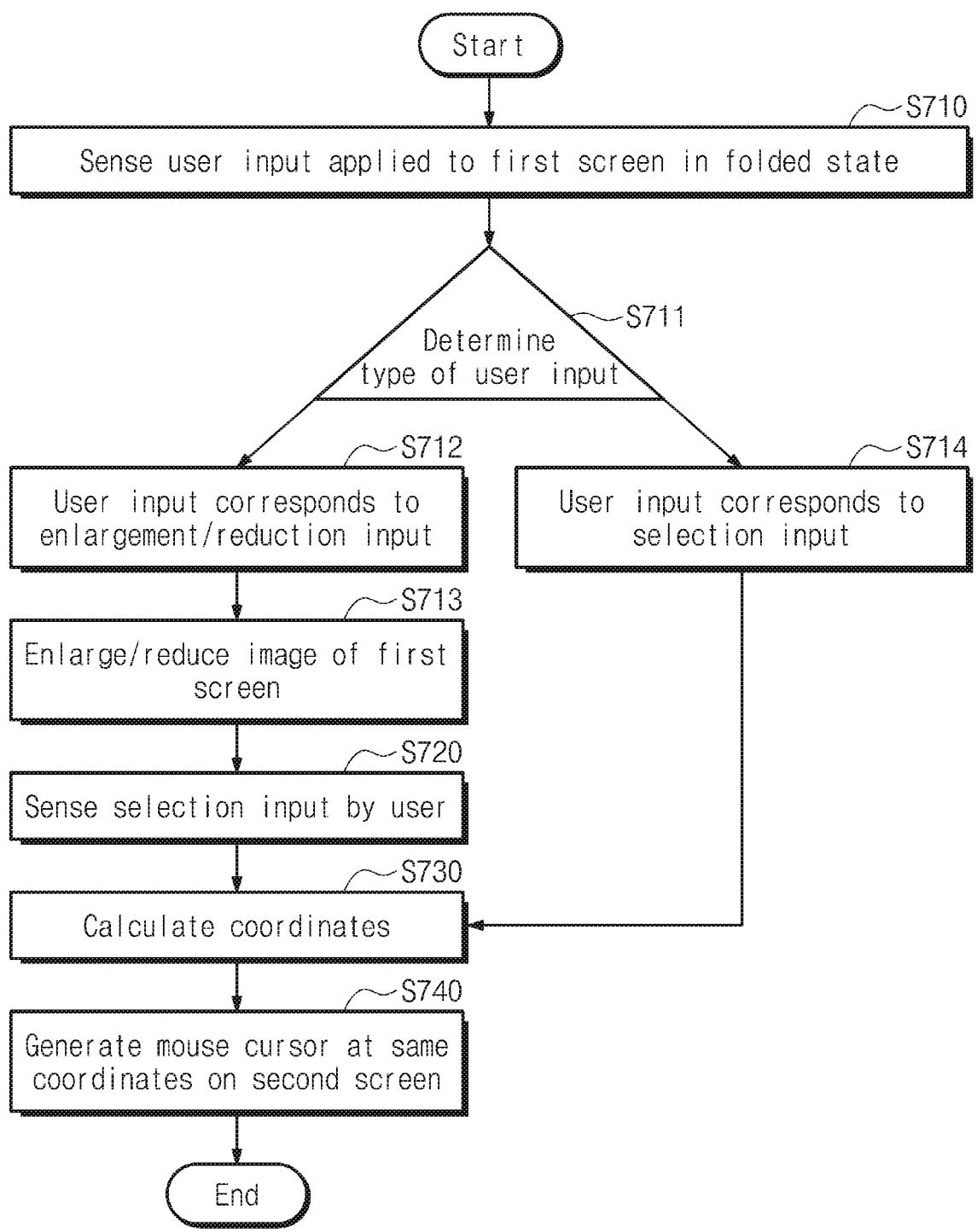

FIG. 10 is a flowchart showing the operating method of the display device according to an embodiment.

According to an embodiment, the input sensing unit 310 may sense the user input UIP applied to the second image IM2 of the first screen 110 when the display device is in the folded state (S710). The second image IM2 may be the same image as the first image IM1 displayed on the second screen 120.

The input sensing unit 310 may determine a type of the user input UIP applied to the second image IM2 of the first screen 110 (S711). The input sensing unit 310 may determine the type of the user input UIP through the user's touch method.

When the selection input is applied, the input sensing unit 310 may transmit the selection input to the coordinate calculator 320 to calculate the coordinates, and the cursor generator 330 may generate the cursor at corresponding coordinates on the second screen 120 (S714, S730 and S740).

When the enlargement or reduction input is applied, the input sensing unit 310 may enlarge or reduce the second image IM2 of the first screen 110 (S712 and S713). The enlargement or reduction of the second image IM2 of the first screen 110 is not limited to being performed by the input sensing unit 310 and may be performed by the controller 300. Then, when the selection input is sensed on the enlarged second image IM2, the input sensing unit 310 may sense the selection input and may transmit a signal corresponding to the selection input to the coordinate calculator 320, and the cursor generator 330 may generate the cursor at the same coordinates of the second screen.

According to the present embodiment, the operating method of the display device may provide the touch pad on the first screen displaying the same image as the second screen on which the cursor is generated. Since the image on the touch pad is enlarged independently and the user clicks the specific coordinates on the enlarged image, the click accuracy may be improved.

Figure 11:
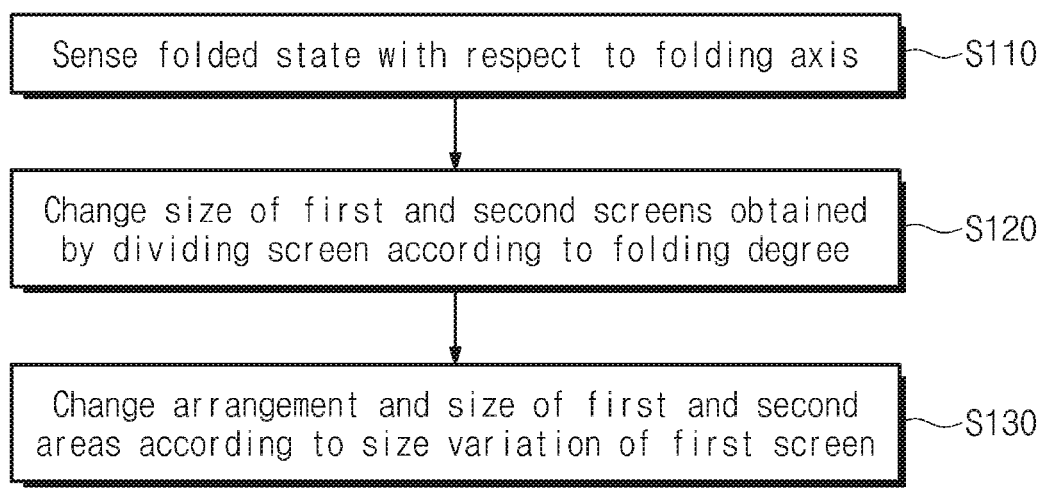

FIG. 11 is a flowchart showing a variation in size of the screen according to the folding degree.

Referring to FIG. 11, when the display device 1000 (refer to FIG. 1A) is folded with respect to the folding axis FX1 or FX2 (refer to FIG. 1A), the display device 1000 may sense the folded state (S110). As an example, the controller 300 (refer to FIG. 7) may sense the folded state of the display device 1000.

According to an embodiment, the display device 1000 may change the size of the first screen 110 (refer to FIG. 4A) and the size of the second screen 120 (refer to FIG. 4A), which are obtained by dividing the screen, according to the folding degree in the folded state (S120). As an example, the controller 300 (refer to FIG. 7) may control the size of the first screen 110 and the size of the second screen 120 based on the folding degree. When the size of the first screen 110 decreases, the size of the second screen 120 may increase, and when the size of the first screen 110 increases, the size of the second screen 120 may decrease.

Then, the display device 1000 may change the arrangement and the size of the first area 112 (refer to FIG. 4A) and the second area 114 (refer to FIG. 4A), which are defined in the first screen 110, according to the variation in size of the first screen 110 (S130). When the size of the first screen 110 decreases, the size of the first area 112 and the size of the second area 114 may decrease.

FIGS. 12A to 12D are cross-sectional views showing display devices 1000 according to embodiments of the present disclosure. FIGS. 12A to 12D show cross-sections defined by a second directional axis DR2 and a third directional axis DR3. In FIGS. 12A to 12D, components of the display device 1000 are schematically shown to explain a stacking relationship of a functional panel and/or functional units that form the display device 1000.

The display device 1000 according to an embodiment of the present disclosure may include a display panel, an input sensor, an anti-reflective unit, and a window. At least some components of the display panel, the input sensor, the anti-reflective unit, and the window may be formed through successive processes or may be attached to each other by an adhesive member. FIGS. 12A to 12D show a pressure sensitive adhesive (PSA) film as a representative example of the adhesive member. The adhesive member described hereinafter may include a conventional adhesive. The present invention is not limited thereto. According to an embodiment, the anti-reflective unit may be replaced with another component or may be omitted.

In FIGS. 12A to 12D, among the input sensor, the anti-reflective unit, and the window, a component that is formed through the successive processes with another component is referred to as a "layer". Among the input sensor, the anti-reflective unit, and the window, a component that is coupled to another component by the adhesive member is referred to as a "panel". The panel includes a base layer providing a base surface, e.g., a synthetic resin film, a composite material film, or a glass substrate, however, the base layer may be omitted from the component that is referred to as the "layer". In other words, the component that is referred to as the "layer" is disposed on the base surface provided by another component.

The input sensor, the anti-reflective unit, and the window may be referred to as an input sensing panel ISP, an anti-reflective panel RPP, and a window panel WP, respectively, or an input sensing layer ISL, an anti-reflective layer RPL, and a window layer WL, respectively, depending on a presence or absence of the base layer.

Figure 12A:
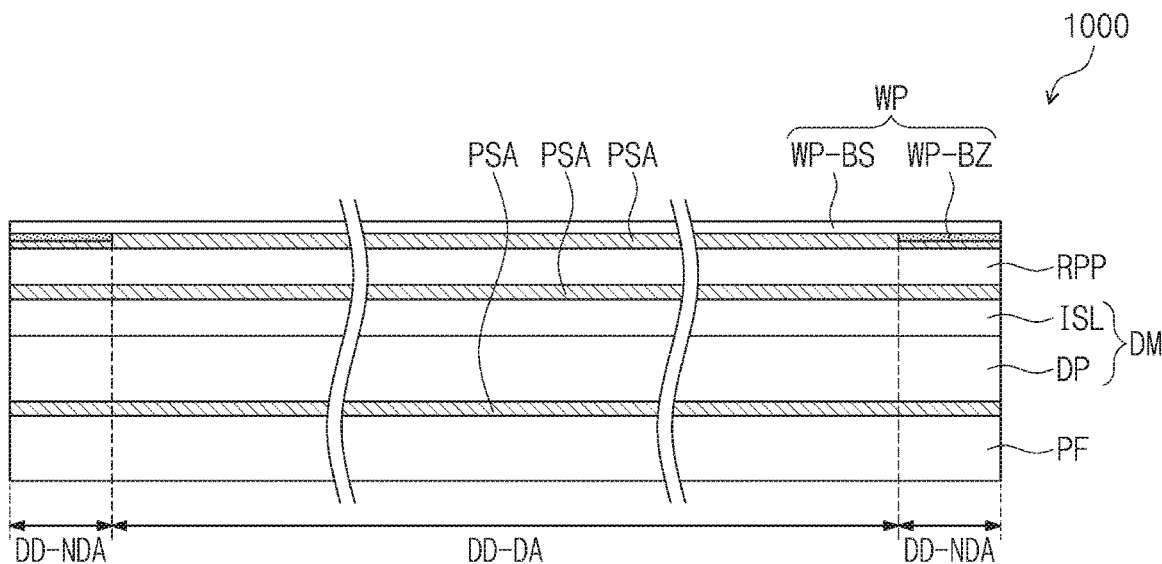
FIGS. 12A to 12D are cross-sectional views showing display devices according to embodiments of the present disclosure.
Figure 12A:
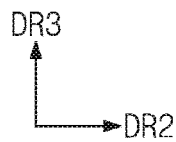

Referring to FIG. 12A, the display device 1000 may include the display panel DP, the input sensing layer ISL, the anti-reflective panel RPP, the window panel WP, and a protective member PF. The input sensing layer ISL is disposed directly on the display panel DP. In the present disclosure, the expression a component "B 1" is disposed directly on a component "A1" means that no intervening elements, such as an adhesive layer/adhesive member, are present between the component "B 1" and the component "A1". The component "B 1" is formed on a base surface provided by the component "A1" through successive processes after the component "A1" is formed.

The display panel DP and the input sensing layer ISL disposed directly on the display panel DP may be defined as a display module DM. The pressure sensitive adhesive film PSA may be disposed between the anti-reflective panel RPP and the window panel WP, between the display module DM and the anti-reflective panel RPP, and between the protective member PF and the display module DM.

The display panel DP may display a still image or a video on a display surface. The display panel DP may generate the image, and the input sensing layer ISL may obtain coordinate information of an external input (e.g., touch event). The protective member PF may support the display panel DP and may protect the display panel DP from external impacts.

The protective member PF may include a plastic film as its base layer. The protective member PF may include a thermoplastic resin, for instance, the plastic film including one selected from the group consisting of polyethylene terephthalate (PET), polyethylene (PE), polyvinylchloride (PVC), polypropylene (PP), polystyrene (PS), polyacrylonitrile (PAN), styrene-acrylonitrile copolymer (SAN), acrylonitrile-butadiene-styrene (ABS), polymethyl methacrylate (PMMA) and combinations thereof. In some embodiments, polyethylene terephthalate (PET) has excellent heat resistance, fatigue strength, and electrical properties and is less affected by temperature and humidity.

The material for the protective member PF is not limited to plastic resins. In some embodiments, organic-inorganic composite material may be used for the protective member PF. The protective member PF may include a porous organic layer and an inorganic material filled in pores of the organic layer.

The display panel DP according to an embodiment of the present disclosure may be a light emitting type display panel. The present invention, however, is not limited thereto. For instance, the display panel DP may be an organic light emitting display panel or a quantum dot light emitting display panel. A light emitting layer of the organic light emitting display panel may include or may be formed of an organic light emitting material. A light emitting layer of the quantum dot light emitting display panel may include a quantum dot and/or a quantum rod. Hereinafter, the organic light emitting display panel will be described as a representative example of the display panel DP.

The anti-reflective panel RPP may reduce a reflectance of a natural light (sunlight) incident thereto from above the window panel WP. The anti-reflective panel RPP may include or may be a retarder and a polarizer. The retarder may be a film type or a liquid crystal coating type and may include or may be a λ/2 retarder and/or a λ/4 retarder. The polarizer may also be a film type or a liquid crystal coating type. The film type may include a stretching type synthetic resin film, and the liquid crystal coating type may include liquid crystals arranged in a predetermined arrangement. The retarder and the polarizer may further include a protective film. The retarder and the polarizer, or the protective film may be defined as a base layer of the anti-reflective panel RPP.

According to an embodiment, the anti-reflective panel RPP may include color filters. The color filters may have a predetermined arrangement. The arrangement of the color filters may be determined by taking into account emission colors of pixels included in the display panel DP. The anti-reflective panel RPP may further include a black matrix disposed adjacent to the color filters.

According to an embodiment, the window panel WP may include a base layer WP-BS and a light blocking pattern WP-BZ. The base layer WP-BS may include or may be formed of a glass substrate and/or a synthetic resin film. The base layer WP-BS is not be limited to a single-layer structure. In some embodiments, the base layer WP-BS may include two or more films coupled to each other by the adhesive member.

The light blocking pattern WP-BZ may partially overlap the base layer WP-BS. The light blocking pattern WP-BZ may be disposed on a rear surface of the base layer WP-BS to define a bezel area of the display device 1000.

The light blocking pattern WP-BZ may be a colored organic layer and may be formed through a coating process. Although not shown separately, the window panel WP may further include a functional coating layer disposed over an entire surface of the base layer WP-BS. The functional coating layer may include an anti-fingerprint layer, an anti-reflective layer, and a hard coating layer.

Figure 12B:
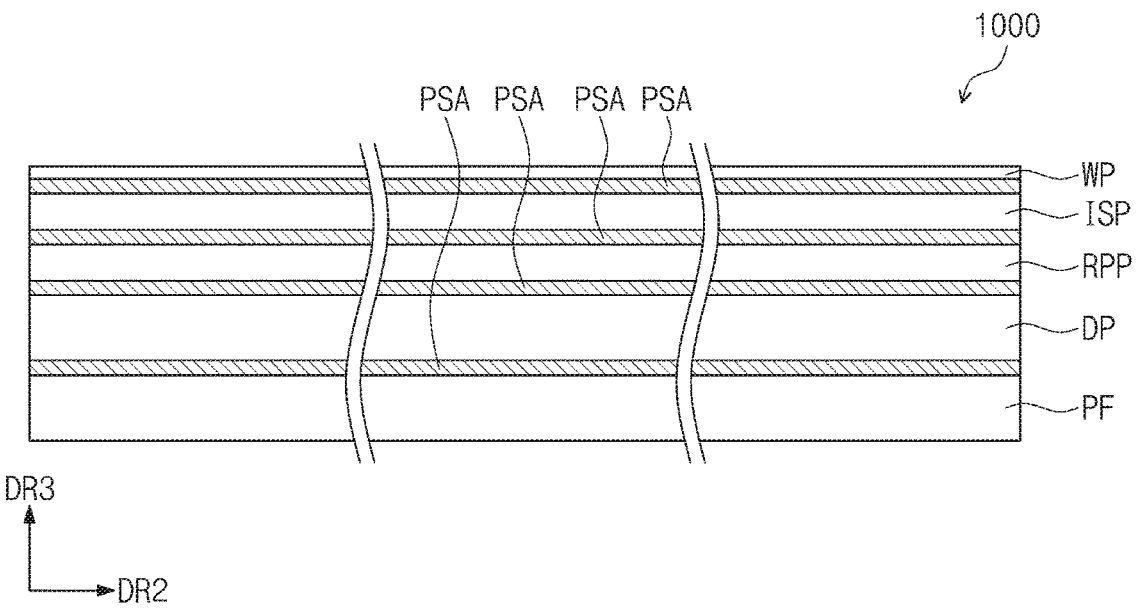
Figure 12B:
Figure 12C:
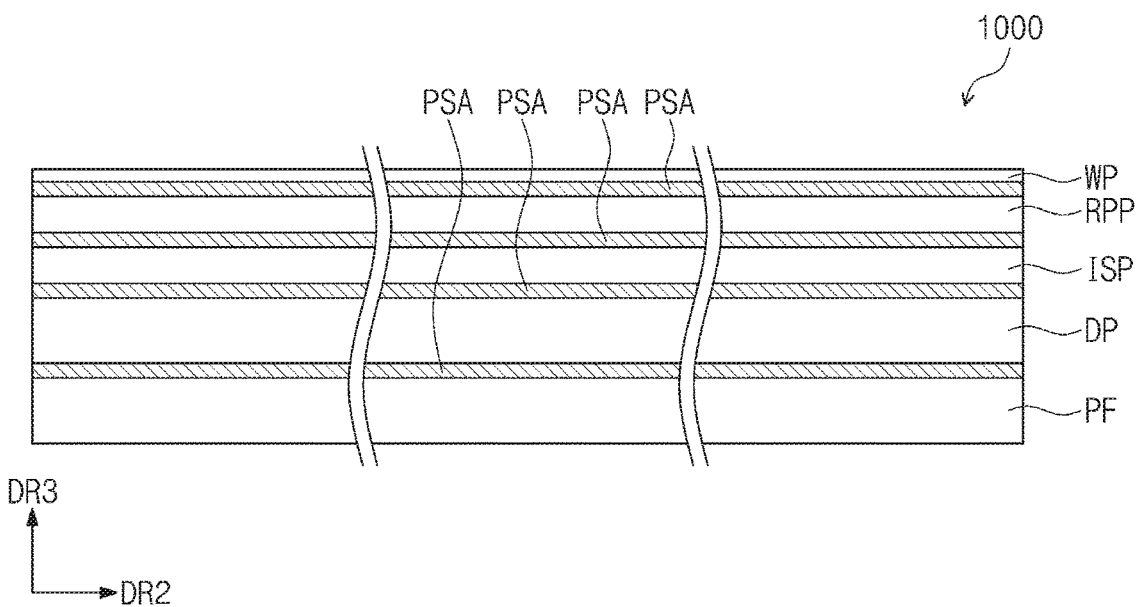
Figure 12D:
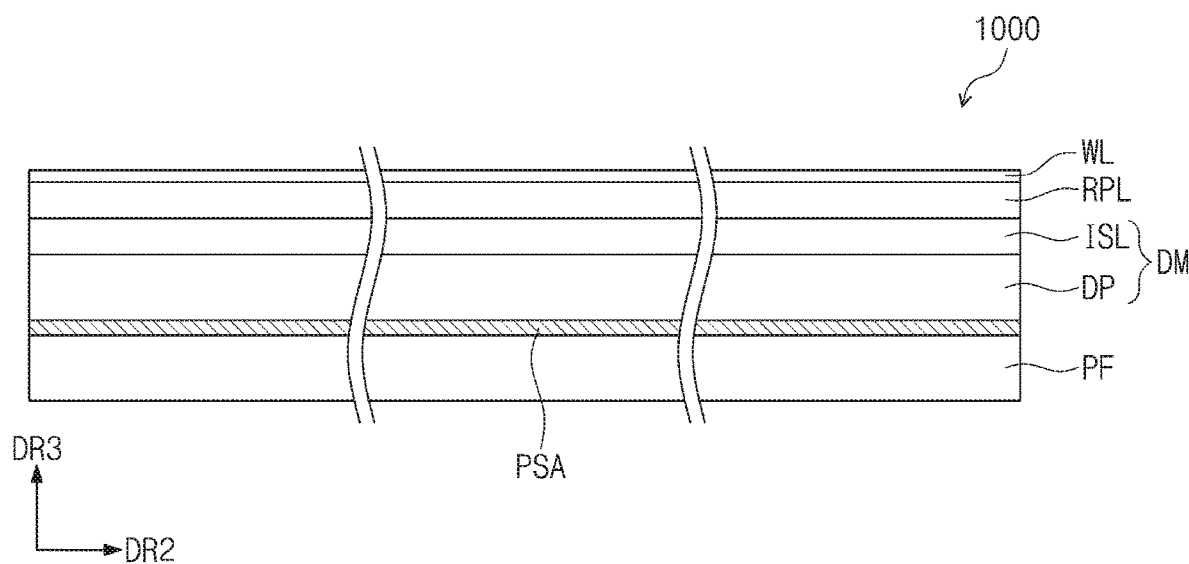

In FIGS. 12B to 12D, the window panel WP and the window layer WL are briefly shown without distinguishing the base layer WP-BS from the light blocking pattern WP-BZ.

As shown in FIGS. 12B and 12C, the display device 1000 may include the protective member PF, the display panel DP, the anti-reflective panel RPP, the input sensing panel ISP, and the window panel WP. The stacking order of the input sensing panel ISP and the anti-reflective panel RPP may be changed.

As shown in FIG. 12D, the display device 1000 may include the protective member PF, the display panel DP, the input sensing layer ISL, the anti-reflective layer RPL, and the window layer WL. Adhesive members may be omitted from the display device 1000, and the input sensing layer ISL, the anti-reflective layer RPL, and the window layer WL may be formed on a base surface of the display panel DP through successive processes. The stacking order of the input sensing layer ISL and the anti-reflective layer RPL may be changed.

In some embodiments, the anti-reflective layer RPL may include a liquid crystal coating type retarder and a liquid crystal coating type polarizer. The retarder and the polarizer may include a discotic liquid crystal layer having a tilt angle in one direction.

Figure 13:
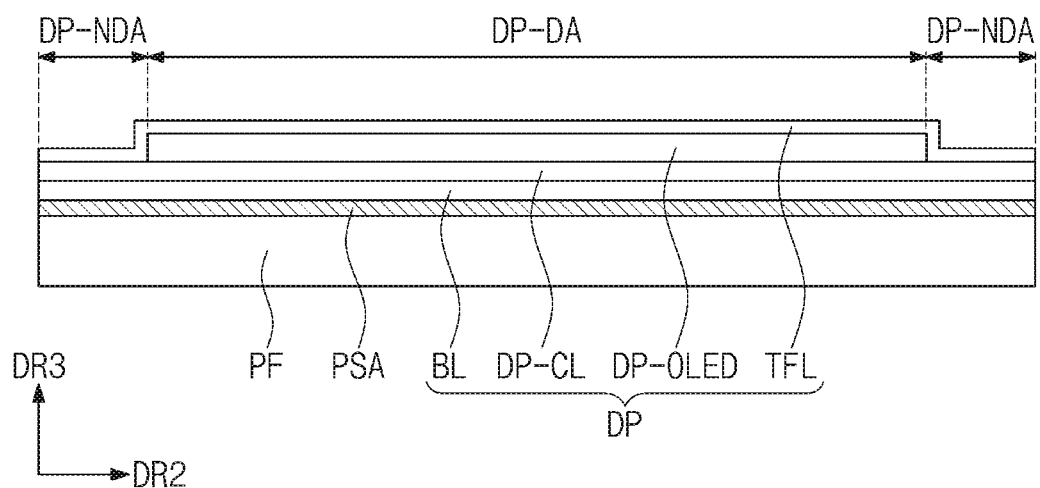
FIG. 13 is a cross-sectional view showing a display panel according to an embodiment of the present disclosure.
Figure 14:
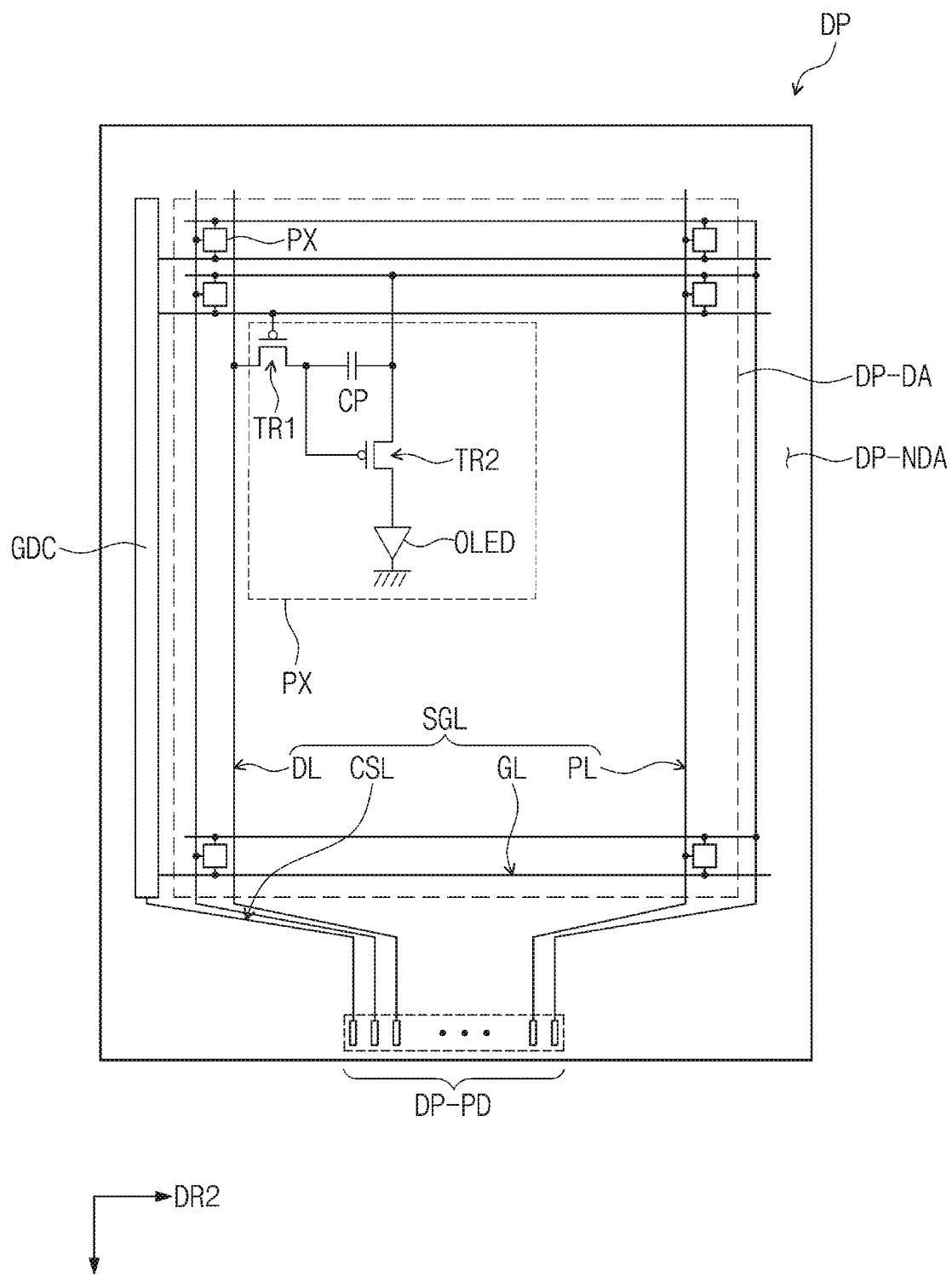
FIG. 14 is a plan view showing a display panel according to an embodiment of the present disclosure.
Figure 15:
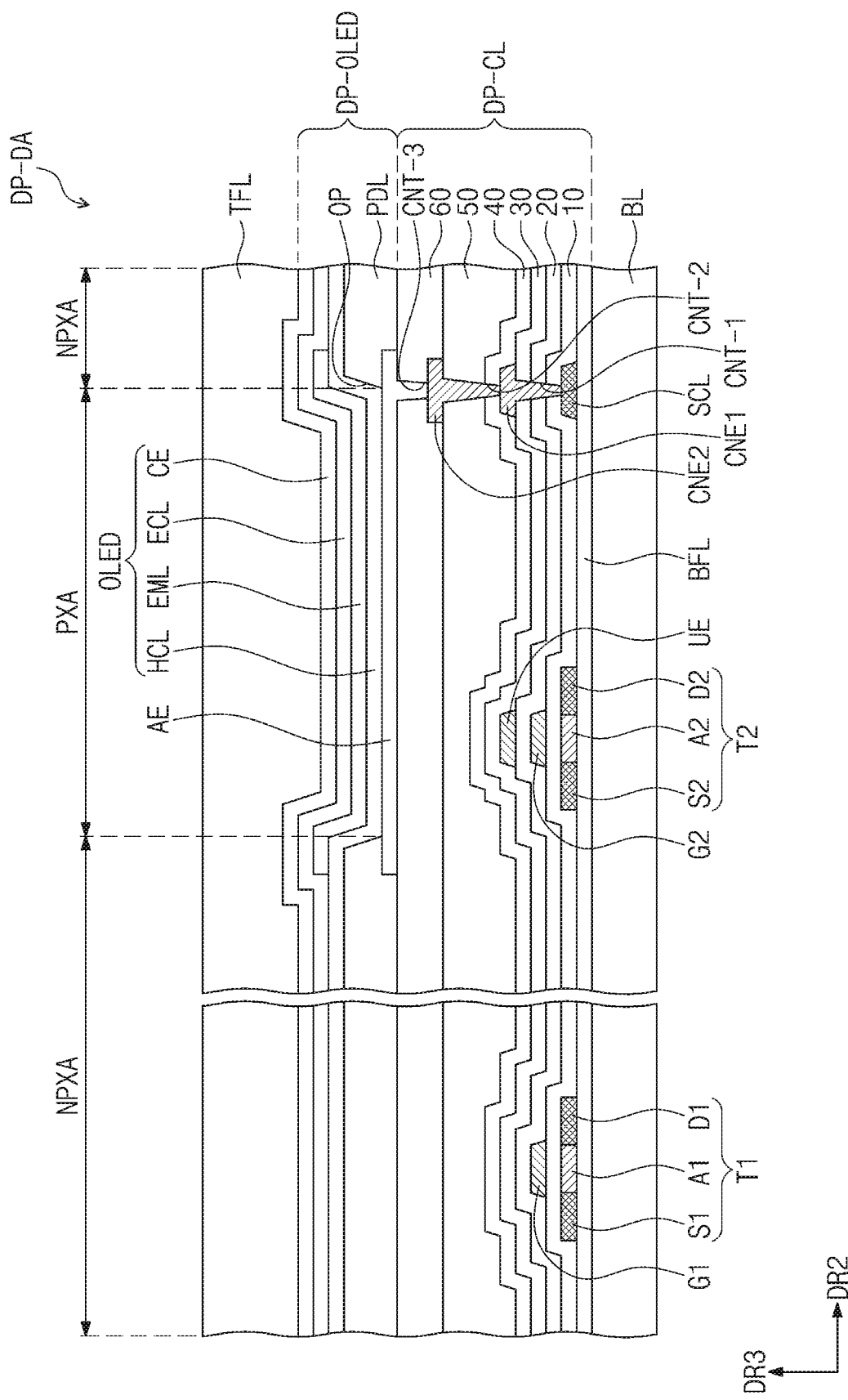
FIG. 15 is a cross-sectional view showing a portion of a display panel corresponding to a pixel shown in FIG. 14.

FIG. 13 is a cross-sectional view showing the display panel DP according to an embodiment of the present disclosure. FIG. 14 is a plan view showing the display panel DP according to an embodiment of the present disclosure. FIG. 15 is a cross-sectional view showing a portion of the display panel DP corresponding to a pixel shown in FIG. 14. Details on the display panel DP described hereinafter may be applied to the display device 1000 described with reference to FIGS. 12A to 12D. FIG. 14 shows the protective member PF disposed on a rear surface of the display panel DP.

Referring to FIG. 13, the display panel DP may include a base layer BL, a circuit element layer DP-CL, a display element layer DP-OLDE, and an upper insulating layer TFL, which are disposed on the base layer BL.

The base layer BL may include or may be formed of a synthetic resin film. A synthetic resin layer may be formed on a work substrate used to manufacture the display panel DP. Then, a conductive layer and an insulating layer may be formed on the synthetic re sin layer. When the work substrate is removed, the synthetic resin layer may correspond to the base layer BL. The synthetic resin layer may include or may be formed of a thermosetting resin. For example, the synthetic resin layer may be a polyimide-based resin. The present invention, however, is not limited thereto. According to an embodiment, the base layer BL may include or may be formed of a glass substrate, a metal substrate, or an organic/inorganic composite material substrate.

The circuit element layer DP-CL may include at least one insulating layer and a circuit element. Hereinafter, the insulating layer included in the circuit element layer DP-CL may be referred to as an intermediate insulating layer. The intermediate insulating layer may include at least one intermediate inorganic layer and/or at least one intermediate organic layer. The circuit element may include a signal line, a pixel driving circuit, or the like. The circuit element layer DP-CL may be formed by a coating or depositing process to form an insulating layer, a semiconductor layer, and a conductive layer and a photolithography process to pattern the insulating layer, the semiconductor layer, and the conductive layer.

The display element layer DP-OLED may include or may be formed of a light emitting element. The display element layer DP-OLED may include organic light emitting diodes. The display element layer DP-OLED may include or may be formed of an organic layer such as a pixel definition layer.

The upper insulating layer TFL may encapsulate at least the display element layer DP-OLED. The upper insulating layer TFL may include a thin film encapsulation layer TFL. The upper insulating layer TFL may further include another functional thin layer. The thin film encapsulation layer may include at least one inorganic layer (hereinafter, referred to as an encapsulation inorganic layer). According to an embodiment, the thin film encapsulation layer may include at least one organic layer (hereinafter, referred to as an encapsulation organic layer) and at least one encapsulation inorganic layer.

The encapsulation inorganic layer may protect the display element layer DP-OLED from moisture and oxygen, and the encapsulation organic layer may protect the display element layer DP-OLED from a foreign substance such as dust particles. The encapsulation inorganic layer may include or may be formed of a silicon nitride layer, a silicon oxynitride layer, a silicon oxide layer, a titanium oxide layer, or an aluminum oxide layer. The present invention, however, is not limited thereto. In some embodiments, the encapsulation organic layer may include or may be formed of an acrylic-based organic layer. The present invention, however, is not limited thereto.

According to an embodiment, the upper insulating layer TFL may be omitted. The upper insulating layer TFL may be replaced with an encapsulation substrate such as a glass substrate. The encapsulation substrate may be coupled with the display panel DP by a sealant. The sealant disposed in a non-display area DP-NDA (refer to FIG. 14) may directly attach the glass substrate to the circuit element layer DP-CL.

Referring to FIG. 14, the display panel DP may include a driving circuit GDC, a plurality of signal lines SGL, a plurality of signal pads DP-PD, and a plurality of pixels PX.

The driving circuit GDC may include a scan driving circuit. The scan driving circuit may generate a plurality of scan signals and may sequentially output the scan signals to a plurality of scan lines GL described later. The scan driving circuit may further output other control signals to the pixel driving circuit of the pixels PX.

The scan driving circuit may include a plurality of transistors formed through the same processes, e.g., a low temperature polycrystalline silicon (LTPS) process or a low temperature polycrystalline oxide (LTPO) process, as the pixel driving circuit of the pixels PX.

The signal lines SGL may include the scan lines GL, data lines DL, a power line PL, and a control signal line CSL. Each of the scan lines GL may be connected to a corresponding pixel among the pixels PX, and each of the data lines DL may be connected to a corresponding pixel among the pixels PX. The power line PL may be connected to the pixels PX. The control signal line CSL may provide control signals to the scan driving circuit.

A display area DP-DA may be defined as an area in which the pixels PX are arranged. Electronic elements may be disposed in the display area DP-DA. The electronic elements may include the organic light emitting diode and the pixel driving circuit connected to the organic light emitting diode, which are included in each pixel PX. The driving circuit GDC, the signal lines SGL, the signal pads DP-PD, and the pixel driving circuit may be included in the circuit element layer DP-CL shown in FIG. 13.

The pixel PX may include, for example, a first transistor T1, a second transistor T2, a capacitor CP, and an organic light emitting diode OLED. The pixel driving circuit is not limited to that shown in FIG. 14 as long as the pixel driving circuit may include a switching transistor and a driving transistor. The first transistor T1 may be connected to the scan line GL and the data line DL. The organic light emitting diode OLED may receive a power voltage provided thereto via the power line PL.

Referring to FIG. 15, the display panel DP may include a plurality of insulating layers, a semiconductor pattern, a conductive pattern, and a signal line. An insulating layer, a semiconductor layer, and a conductive layer may be formed by a coating or depositing process. Then, the insulating layer, the semiconductor layer, and the conductive layer may be selectively patterned by a photolithography process. In this way, the semiconductor pattern, the conductive pattern, and the signal line included in the circuit element layer DP-CL and the display element layer DP-OLED may be formed.

At least one inorganic layer may be formed on an upper surface of the base layer BL. The inorganic layer may include or may be formed of at least one of aluminum oxide, titanium oxide, silicon oxide, silicon oxynitride, zirconium oxide, and hafnium oxide. The inorganic layer may be formed in multiple layers. The inorganic layers may form a barrier layer and/or a buffer layer. In the present embodiment, the display panel DP may include a buffer layer BFL.

The buffer layer BFL may increase a coupling force between the base layer BL and the semiconductor pattern. The buffer layer BFL may include or may be formed of a silicon oxide layer and a silicon nitride layer. In some embodiments, the silicon oxide layer and the silicon nitride layer may be alternately stacked on each other.

The semiconductor pattern may be disposed on the buffer layer BFL. The semiconductor pattern may include or may be formed of polysilicon. The present invention, however, is not limited thereto or thereby. In some embodiments, the semiconductor pattern may include or may be formed of amorphous silicon or metal oxide.

FIG. 15 shows only a portion of the semiconductor pattern, and the semiconductor pattern may be further disposed in other areas of the pixel PX. The semiconductor pattern may be arranged with a specific rule over the pixels PX. The semiconductor pattern may have different electrical properties depending on whether it is doped or not or whether it is doped with an N-type dopant or a P-type dopant. The semiconductor pattern may include a doped region and a non-doped region. The doped region may be doped with the N-type dopant or the P-type dopant. A P-type transistor may include or may be a doped region doped with the P-type dopant.

The doped region may have a conductivity greater than that of the non-doped region and may substantially serve as an electrode or signal line. The non-doped region may substantially correspond to an active (or a channel) of a transistor. In other words, a portion of the semiconductor pattern may be the active of the transistor, another portion of the semiconductor pattern may be a source or a drain of the transistor, and the other portion of the semiconductor pattern may be a connection electrode or a connection signal line.

As shown in FIG. 15, a source S1, an active A1, and a drain D1 of the first transistor T1 may be formed from the semiconductor pattern, and a source S2, an active A2, and a drain D2 of the second transistor T2 may be formed from the semiconductor pattern. The sources S1 and S2 and the drains D1 and D2 may extend in opposite directions to each other from the actives A1 and A2. FIG. 15 shows a portion of the connection signal line SCL formed from the semiconductor pattern. Although not shown in figures, the connection signal line SCL may be connected to the drain D2 of the second transistor T2 in a plane.

A first insulating layer 10 may be disposed on the buffer layer BFL. The first insulating layer 10 may commonly overlap the pixels PX (refer to FIG. 14) and may cover the semiconductor pattern. The first insulating layer 10 may be an inorganic layer and/or an organic layer and may have a single-layer or multi-layer structure. The first insulating layer 10 may include or may be formed of at least one of aluminum oxide, titanium oxide, silicon oxide, silicon oxynitride, zirconium oxide, and hafnium oxide. In the present embodiment, the first insulating layer 10 may have a single-layer structure of a silicon oxide layer. Not only the first insulating layer 10, but also an insulating layer of the circuit element layer DP-CL described later may be an inorganic layer and/or an organic layer and may have a single-layer or multi-layer structure. The inorganic layer may include or may be formed of at least one of the above-mentioned materials.

Gates G1 and G2 may be disposed on the first insulating layer 10. The gate G1 may correspond to a portion of metal pattern. The gates G1 and G2 may overlap the actives A1 and A2, respectively. The gates G1 and G2 may be used as a mask in a process of doping the semiconductor pattern.

A second insulating layer 20 may be disposed on the first insulating layer 10 and may cover the gates G1 and G2. The second insulating layer 20 may commonly overlap the pixels PX (refer to FIG. 14). The second insulating layer 20 may be an inorganic layer and/or an organic layer and may have a single-layer or multi-layer structure. In the present embodiment, the second insulating layer 20 may have a single-layer structure of silicon oxide.

An upper electrode UE may be disposed on the second insulating layer 20. The upper electrode UE may overlap the gate G2 of the second transistor T2. The upper electrode UE may be a portion of metal pattern. A portion of the gate G2 and the upper electrode UE overlapping the portion of the gate G2 may define the capacitor CP (refer to FIG. 14). According to an embodiment, the upper electrode UE may be omitted.

A third insulating layer 30 may be disposed on the second insulating layer 20 and may cover the upper electrode UE. In the present embodiment, the third insulating layer 30 may have a single-layer structure of a silicon oxide layer. A first connection electrode CNE1 may be disposed on the third insulating layer 30. The first connection electrode CNE1 may be connected to the connection signal line SCL via a contact hole CNT-1 defined through the first, second, and third insulating layers 10, 20, and 30.

A fourth insulating layer 40 may be disposed on the third insulating layer 30. The fourth insulating layer 40 may have a single-layer structure of a silicon oxide layer. A fifth insulating layer 50 may be disposed on the fourth insulating layer 40. The fifth insulating layer 50 may be an organic layer. A second connection electrode CNE2 may be disposed on the fifth insulating layer 50. The second connection electrode CNE2 may be connected to the first connection electrode CNE1 via a contact hole CNT-2 defined through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer. A first electrode AE (or an anode) may be disposed on the sixth insulating layer 60. The first electrode AE may be connected to the second connection electrode CNE2 via a contact hole CNT-3 defined through the sixth insulating layer 60. An opening OP may be defined through the pixel definition layer PDL. At least a portion of the first electrode AE may be exposed through the opening OP of the pixel definition layer PDL.

As shown in FIG. 15, the display area DP-DA may include a light emitting area PXA and a non-light-emitting area NPXA defined adjacent to the light emitting area PXA. The non-light-emitting area NPXA may surround the light emitting area PXA. In the present embodiment, the light emitting area PXA may be defined to correspond to the portion of the first electrode AE exposed through the opening OP.

A hole control layer HCL may be commonly disposed in the light emitting area PXA and the non-light-emitting area NPXA. The hole control layer HCL may include a hole transport layer and may further include a hole injection layer. A light emitting layer EML may be disposed on the hole control layer HCL. The light emitting layer EML may be disposed in an area corresponding to the opening OP. That is, the light emitting layer EML may be formed in each of the pixels PX after being divided into portions.

An electron control layer ECL may be disposed on the light emitting layer EML. The electron control layer ECL may include an electron transport layer and may further include an electron injection layer. The hole control layer HCL and the electron control layer ECL may be commonly formed in the plural pixels using an open mask. A second electrode CE (or a cathode) may be disposed on the electron control layer ECL. The second electrode CE may have an integral shape and may be commonly disposed in the pixels PX (refer to FIG. 14). As shown in FIG. 15, the upper insulating layer TFL may be disposed on the second electrode CE. The hole control layer HCL, the electron control layer ECL, and the light emitting layer EML may define the organic light emitting diode OLED.

Figure 16:
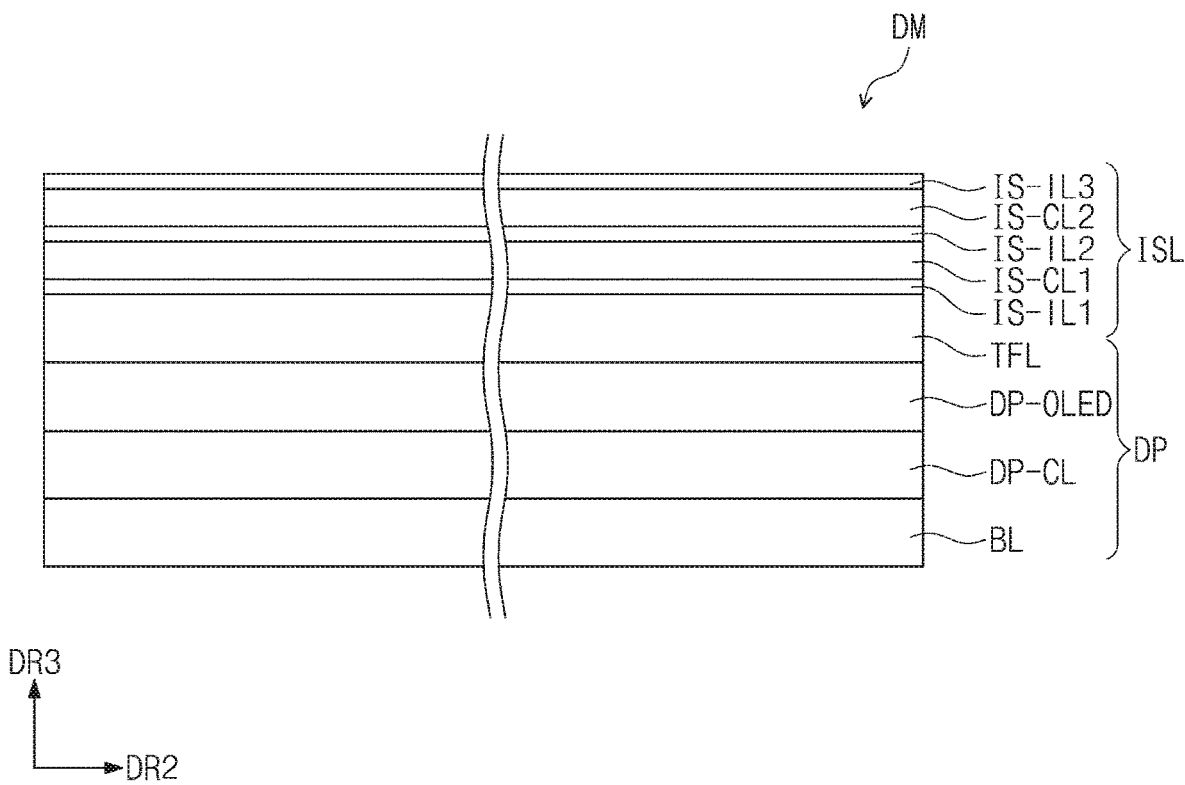
FIG. 16 is a cross-sectional view showing a display module according to an embodiment of the present disclosure.

FIG. 16 is a cross-sectional view showing the display module DM according to an embodiment of the present disclosure.

FIG. 16 shows the input sensor of the "layer" type, i.e., the input sensing layer, among the input sensors described with reference to FIGS. 12A to 12D. The input sensor may have a multi-layer structure regardless of whether the input sensor is the "panel" type or the "layer" type. The input sensor may include a sensing electrode, a signal line connected to the sensing electrode, and at least one insulating layer. The input sensor may sense an external input using a capacitance method.

Referring to FIG. 16, the input sensing layer ISL may include a first insulating layer IS-IL1 (or a first sensor insulating layer), a first conductive layer IS-CL1, a second insulating layer IS-IL2 (or a second sensor insulating layer), a second conductive layer IS-CL2, and a third insulating layer IS-IL3 (or a third sensor insulating layer). The first insulating layer IS-IL1 may be disposed directly on the upper insulating layer TFL. According to an embodiment, the first insulating layer IS-IL1 and/or the third insulating layer IS-IL3 may be omitted.

Each of the first conductive layer IS-CL1 and the second conductive layer IS-CL2 may have a single-layer structure or a multi-layer structure of layers stacked in the third directional axis DR3. The conductive layer having the multi-layer structure may include two or more layers of a transparent conductive layer and a metal layer. The conductive layer having the multi-layer structure may include metal layers containing different metals from each other. The transparent conductive layer may include or may be formed of at least one of indium tin oxide (ITO), indium zinc oxide (IZO), zinc oxide (ZnO), indium tin zinc oxide (ITZO), PEDOT, metal nanowire, and graphene. The metal layer may include or may be formed of molybdenum, silver, titanium, copper, aluminum, and alloys thereof. Each of the first and second conductive layers IS-CL1 and IS-CL2 may have a three-layer structure of titanium/aluminum/titanium. Metals with a relatively high durability and a low reflectance may be applied as an outer layer of the conductive layer, and metals with a high electrical conductivity may be applied as an inner layer of the conductive layer.

Each of the first conductive layer IS-CL1 and the second conductive layer IS-CL2 may include a plurality of conductive patterns. Hereinafter, the first conductive layer IS-CL1 including first conductive patterns and the second conductive layer IS-CL2 including second conductive patterns will be described. Each of the first conductive patterns and the second conductive patterns may include sensing electrodes and signal lines connected to the sensing electrodes.

Each of the first, second, and third insulating layers IS-IL1, IS-IL2, and IS-IL3 may include an inorganic layer or an organic layer. According to an embodiment, each of the first and second insulating layers IS-IL1 and IS-IL2 may include or may be formed of the inorganic layer. The inorganic layer may include or may be formed of at least one of aluminum oxide, titanium oxide, silicon oxide, silicon oxynitride, zirconium oxide, and hafnium oxide. The third insulating layer IS-IL3 may include or may be formed of the organic layer. The organic layer may include or may be formed of at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

In the present embodiment, the second insulating layer IS-IL2 may cover a sensing area IS-DA described later. That is, the second insulating layer IS-IL2 may entirely overlap the sensing area IS-DA. Although not shown in figures, the second insulating layer IS-IL2 may include a plurality of insulating patterns according to an embodiment.

Figure 17:
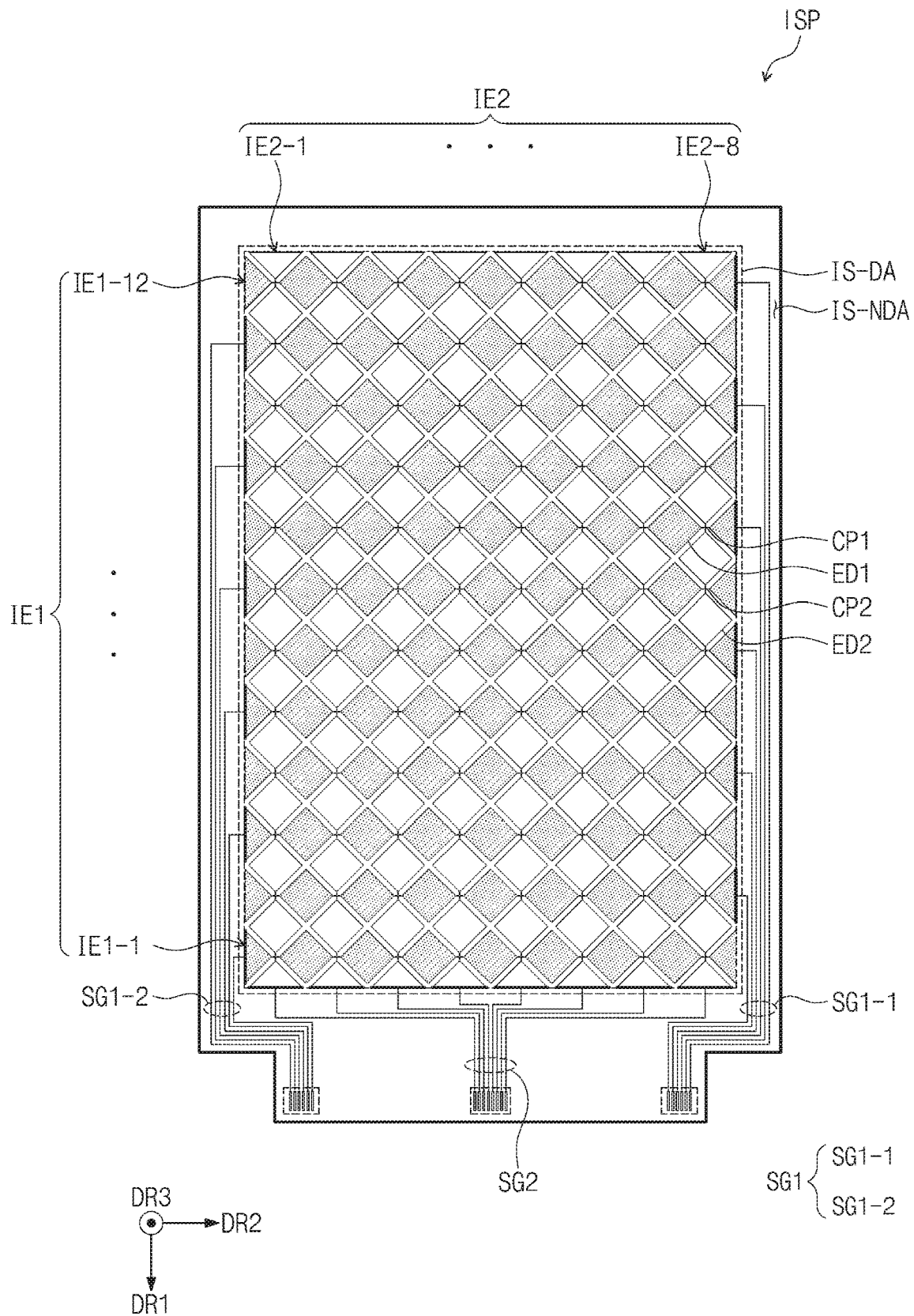
FIG. 17 is a plan view showing an input sensor according to an embodiment of the present disclosure.

FIG. 17 is a plan view showing the input sensor ISP according to an embodiment of the present disclosure. Sensing electrodes IE1 and IE2 included in the input sensor ISP may be designed to have various shapes, and the shape of the sensing electrodes IE1 and IE2 shown in FIG. 17 is merely one example. The sensing electrodes IE1 and IE2 may include a first sensing electrode IE1 and a second sensing electrode IE2.

Referring to FIG. 17, the input sensor ISP may include the first sensing electrode IE1, the second sensing electrode IE2, and signal line groups connected to the first and second sensing electrodes IE1 and IE2. FIG. 17 shows a structure in which the input sensor ISP includes two signal line groups SG1 and SG2 as a representative example.

The input sensor ISP may include the sensing area IS-DA and a line area IS-NDA respectively corresponding to the display area DP-DA and the non-display area DP-NDA of the display panel DP. The first sensing electrode IE1 and the second sensing electrode IE2 may be disposed in the sensing area IS-DA, and a first signal line group SG1 and a second signal line group SG2 may be disposed in the line area IS-NDA.

According to the present embodiment, the input sensor ISP may be a capacitance type touch sensor. The input sensor ISP may obtain information about the external input based on a variation in mutual capacitance between the first sensing electrode IE1 and the second sensing electrode IE2.

One of the first sensing electrode IE1 and the second sensing electrode IE2 may receive a driving signal, and the other of the first sensing electrode IE1 and the second sensing electrode IE2 may output the variation in capacitance between the first sensing electrode IE1 and the second sensing electrode IE2 as a sensing signal. The input sensor ISP may divide a driving section into a first driving section and a second driving section, may be driven as the above-described driving manner in the first driving section, and may be driven in the opposite manner to the above-described driving manner in the second driving section.

The first sensing electrode IE1 may include a plurality of first sensing electrodes IE1-1 to IE1-12. FIG. 17 shows twelve first sensing electrodes IE1-1 to IE1-12 as a representative example. Each of the first sensing electrodes IE1-1 to IE1-12 may have a shape extending in the second direction DR2. The first sensing electrodes IE1-1 to IE1-12 may be arranged in the first direction DR1.

The second sensing electrode IE2 may include a plurality of second sensing electrodes IE2-1 to IE2-8. FIG. 17 shows eight second sensing electrodes IE2-1 to IE2-8. The second sensing electrodes IE2-1 to IE2-8 may have a shape extending in the first direction DR1. The second sensing electrodes IE2-1 to IE2-8 may be arranged in the second direction DR2.

The first sensing electrodes IE1-1 to IE1-12 and the second sensing electrodes IE2-1 to IE2-8 may have a length and a size, which are changed depending on an arrangement of the sensing electrodes and a size of the sensing area IS-DA.

The first signal line group SG1 may include the same number of first signal lines as the first sensing electrodes IE1-1 to IE1-12. The first signal lines may be connected to one ends of the first sensing electrodes IE1-1 to IE1-12. The present invention, however, is not limited thereto or thereby. In some embodiments, both ends (e.g., opposite ends) of the first sensing electrodes IE1-1 to IE1-12 may be connected to the signal lines.

The second signal line group SG2 may include the same number of second signal lines as the second sensing electrodes IE2-1 to IE2-8. The second signal lines may be connected to one ends of the second sensing electrodes IE2-1 to IE2-8. FIG. 17 shows the signal lines of the second signal line group SG2, which are respectively connected to lower ends of the second sensing electrodes IE2-1 to IE2-8.

The first signal line group SG1 may be divided into two groups. One group may be referred to as a first signal line group SG1-1 disposed at one side of the input sensor ISP, and the other group may be referred to as a first signal line group SG1-2 disposed at the other side of the input sensor ISP.

The first signal line group SG1-1 disposed at the one side may be connected to one sides of some of the first sensing electrodes IE1-1 to IE1-12, and the first signal line group SG1-2 disposed at the other side may be connected to the other sides of the other of the first sensing electrodes IE1-1 to IE1-12. The first signal line group SG1-1 disposed at the one side may be spaced apart from the first signal line group SG1-2 disposed at the other side with the sensing area IS-DA interposed therebetween in the second direction DR2. As the first signal lines are disposed at both sides after being into the two groups, a width of the line area IS-NDA may be reduced.

The first signal line group SG1-1 disposed at the one side may be electrically connected to odd-numbered sensing electrodes or even-numbered sensing electrodes among first sensing electrodes IE1-1 to IE1-12. The first signal line group SG1-2 disposed at the other side may be connected to the sensing electrodes to which the first signal line group SG1-1 disposed at the one side is not connected. FIG. 17 shows a structure in which the first signal line group SG1-1 disposed at the one side is connected to right ends of the even-numbered first sensing electrodes.

Each of the first sensing electrodes IE1-1 to IE1-12 may include a plurality of first electrodes ED1 and a plurality of first connection portions CP1. The first electrodes ED1 may be arranged in the second direction DR2. Each of the first connection portions CP1 may connect two first electrodes ED1 adjacent to each other among the first electrodes ED1.

Each of the second sensing electrodes IE2-1 to IE2-8 may include a plurality of second electrodes ED2 and a plurality of second connection portions CP2. The second electrodes ED2 may be arranged in the first direction DR1. Each of the second connection portions CP2 may connect two second electrodes ED2 adjacent to each other among the second electrodes ED2.

Each of the first and second connection portions CP1 and CP2 may cross each other in a plane. The present invention, however, is not limited thereto or thereby. Each of the first connection portions CP1 may have a curved line shape, e.g., an L-shape rotated in clockwise direction by about 90° or an L-shape rotated in counterclockwise direction by about 90°, not to overlap the second connection portions CP2. The first connection portions CP1 having the curved line shape may overlap the second electrodes ED2 when viewed in a plane.

Although the embodiments of the present disclosure have been described, it is understood that the present disclosure is not limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims.

What is claimed is:

1. A foldable display device comprising:
a screen having one of a folded state and an unfolded state, wherein the screen, when being switched from the unfolded state to the folded state, is divided into a first screen configured to sense a user input and a second screen configured to display a first image; and
a controller configured to display a specific image corresponding to the user input on the second screen when the user input is sensed on the first screen in the folded state, wherein the first screen displays a second image that is the same as the first image,
wherein, when the user input is applied to a first coordinate of the second image on the first screen, the controller displays a cursor as the specific image at a second coordinate of the first image on the second screen, and
wherein the second coordinate corresponds to the first coordinate.

2. The foldable display device of claim 1,
wherein the screen senses the user input in the unfolded state and displays the first image in the unfolded state.

3. The foldable display device of claim 1,
wherein the user input is a touch generated by a user or an input generated by an input device, and
wherein the input device comprises an active pen.

4. The foldable display device of claim 1,
wherein the controller is configured to set a coordinate system on the second image, and
wherein the coordinate system of the second image is the same as a coordinate system set on the first image.

5. The foldable display device of claim 1,
wherein the controller moves the cursor displayed at the second coordinate in response to a variation in coordinates of the user input applied to the first coordinate.

6. The foldable display device of claim 1,
wherein the first screen comprises a first area in which a keyboard is displayed and a second area in which the second image is displayed.

7. The foldable display device of claim 6,
wherein the second image is obtained by reducing the first image to fit into a size of the second area.

8. The foldable display device of claim 6,
wherein the second screen has a size that is changed depending on a folding degree in the folded state.

9. The foldable display device of claim 8,
wherein an arrangement structure of the first area and the second area is changed according to the changed size of the second screen.

10. The foldable display device of claim 1,
wherein the second image is enlarged independently from the first image.

11. The foldable display device of claim 10,
wherein, when the user input is applied to a first coordinate of the enlarged second image, the controller generates a cursor at a second coordinate corresponding to the first coordinate on the second screen.

12. The foldable display device of claim 1,
wherein the controller comprises:
an input sensing unit configured to receive the user input through the first screen;
a coordinate calculator configured to calculate a first coordinate of the received user input; and
a cursor generator configured to generate a cursor a s the specific image at a second coordinate on the second screen, and
wherein the second coordinate corresponds to the calculated first coordinate.

13. A method of operating a foldable display device comprising a screen maintained in one of a folded state and an unfolded state and comprising a first screen sensing a user input and a second screen displaying a first image in the folded state, comprising:
sensing a first user input applied to a first coordinate of the first screen in the folded state of the screen;
generating a cursor image at a second coordinate on the second screen in the folded state of the screen, the second coordinate on the second screen corresponding to the first coordinate on the first screen; and
performing a clicking operation on the second coordinate when the first user input is released, wherein the first screen displays a second image, the second image being the same as the first image.

14. The method of claim 13, further comprising:
moving the cursor image generated at the second coordinate to other coordinates in response to the first user input.

15. The method of claim 13,
wherein the first coordinate is substantially the same as the second coordinate.

16. The method of claim 13,
wherein the first screen comprises:
a first area in which a keyboard is displayed; and
a second area in which the second image is displayed, and wherein an arrangement structure of the first area and the second area in a plane is changed according to the first user input or a size of the first screen.

17. The method of claim 13, further comprising:
enlarging or reducing the second image independently from the first image in response to the first user input.

18. The method of claim 17,
wherein the sensing of the first user input comprises sensing the first user input applied to the first coordinate on the enlarged second image.

19. The method of claim 13,
wherein the first user input comprises a touch generated by a user or an input generated by an input device, and
wherein the input device comprises an active pen.

* * * * *